(12) United States Patent
Draper et al.

(10) Patent No.: US 8,362,707 B2
(45) Date of Patent: Jan. 29, 2013

(54) LIGHT EMITTING DIODE BASED LIGHTING SYSTEM WITH TIME DIVISION AMBIENT LIGHT FEEDBACK RESPONSE

(75) Inventors: William A. Draper, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 589 days.

(21) Appl. No.: 12/495,206

(22) Filed: Jun. 30, 2009

(65) Prior Publication Data
US 2010/0171442 A1     Jul. 8, 2010

Related U.S. Application Data

(60) Provisional application No. 61/122,198, filed on Dec. 12, 2008.

(51) Int. Cl.
*H05B 33/08* (2006.01)
*H05B 37/02* (2006.01)

(52) U.S. Cl. .................. 315/291; 315/294; 315/149

(58) Field of Classification Search .......... 315/291, 315/294, 149, 300, 307, 308, 302, 312, 224
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |

(Continued)

FOREIGN PATENT DOCUMENTS

| | | |
|---|---|---|
| DE | 19713814 | 10/1998 |
| EP | 0585789 A1 | 3/1994 |

(Continued)

OTHER PUBLICATIONS

"HV9931 Unity Power Factor LED Lamp Driver, Initial Release", Supertex Inc., Sunnyvale, CA USA 2005.

(Continued)

*Primary Examiner* — Daniel D Chang
(74) *Attorney, Agent, or Firm* — Hamilton & Terrile, LLP; Kent B. Chambers

(57) ABSTRACT

A lighting system includes time division light output sensing and adjustment for ambient light. In at least one embodiment, time division light output sensing involves modulating power to a light emitting diode (LED) set, and the set of LEDs includes one or more LEDs. In at least one embodiment, each LED in the LED set is included in a single lamp, and, in at least one embodiment, the set of LEDs is contained in multiple lamps. In at least one embodiment, for each lamp, a controller modulates power to the LED set by selectively reducing power to the LED set using time division algorithm to allow a light sensor to sense the brightness of ambient light with a reduced contribution from the LED set. In at least one embodiment, a lighting system also includes time division light output sensing and adjustment for different spectra LEDs.

45 Claims, 14 Drawing Sheets

U.S. PATENT DOCUMENTS

| | | |
|---|---|---|
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,205 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 * | 8/2002 | Muthu et al. .................. 315/149 |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Melanson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shteynberg et al. |
| 7,180,250 B1 | 2/2007 | Gannon |
| 7,183,957 B1 | 2/2007 | Melanson |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,276,861 B1 | 10/2007 | Shteynberg et al. |
| 7,288,902 B1 | 10/2007 | Melanson |
| 7,292,013 B1 | 11/2007 | Chen et al. |
| 7,310,244 B2 | 12/2007 | Yang et al. |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,498,753 B2 | 3/2009 | McAvoy et al. |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,560,876 B2 | 7/2009 | Soo |
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |

| | | |
|---|---|---|
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0632679 | 1/1995 |
| EP | 0636889 | 2/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| GB | 2069269 A | 8/1981 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | WO 2006/022107 A2 | 3/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO 2008/072160 A1 | 6/2008 |
| WO | WO2008072160 | 6/2008 |
| WO | WO2008152838 | 12/2008 |

OTHER PUBLICATIONS

"AN-H52 Application Note: HV9931 Unity Power Factor LED Lamp Driver" Mar. 7, 2007, Supertex Inc., Sunnyvale, CA, USA.

Dustin Rand et al: "Issues, Models and Solutions for Triac Modulated Phase Dimming of LED Lamps" Power Electronics Specialists Conference, 2007. PESC 2007. IEEE, IEEE, P1, Jun. 1, 2007, pp. 1398-1404.

Spiazzi G et al: "Analysis of a High-Power Factor Electronic Ballast for High Brightness Light Emitting Diodes" Power Electronics Specialists, 2005 IEEE 36th Conference on June 12, 2005, Piscatawa, NJ, USA, IEEE, Jun. 12, 2005, pp. 1494-1499.

International Search Report PCT/US2008/062381 dated Feb. 5, 2008.

International Search Report PCT/US2008/056739 dated Dec. 3, 2008.

Written Opinion of the International Searching Authority PCT/US2008/062381 dated Feb. 5, 2008.

Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.

International Search Report PCT/US2008/062398 dated Feb. 2, 2005.

Partial International Search Report PCT/US2008/062387 dated Feb. 5, 2008.

Noon, Jim "UC3855A/B High Performance Power Factor Preregulator", Texas Instruments, SLUA146A, May 1996, Revised Apr. 2004.

International Search Report PCT/GB2006/003259 dated Jan. 12, 2007.

Written Opinion of the International Searching Authority PCT/US2008/056739 dated Dec. 3, 2008.

International Search Report PCT/US2008/056606 dated Dec. 3, 2008.

Written Opinion of the International Searching Authority PCT/US2008/056606 dated Dec. 3, 2008.

International Search Report PCT/US2008/056608 dated Dec. 3, 2008.

Written Opinion of the International Searching Authority PCT/US2008/056608 dated Dec. 3, 2008.

International Search Report PCT/GB2005/050228 dated Mar. 14, 2006.

International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
Texas Instruments, Interleaving Continuous Conduction Mode PFC Controller, UCC28070, SLUS794C, Nov. 2007, revised Jun. 2009, Texas Instruments, Dallas TX.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu,, Apr. 5, 2010, Colorado Power Electronics Center, ECE Department, University of Colorado, Boulder, CO.
International Preliminary Report on Patentability issued on Jun. 14, 2011, in PCT Application No. PCT/US2009/066373.
Written Opinion issued on Jun. 12, 2011, in PCT Application No. PCT/US2009/066373.
R. Ridley, The Nine Most Useful Power Topologies, Oct. 1, 2007, http://www.powersystemsdesign.com/design_tips_oct07.pdf.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt//://focus.ti.com/lit/ml/slup169/slup169.pdf the whole document.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
International Search Report and Written Opinion for PCT Application No. PCT/US2009/066373, mailed Feb. 25, 2010.
Freescale Semiconductor, Inc., Dimmable Light Ballast with Power Factor Correction, Design Reference Manual, DRM067, Rev. 1, Dec. 2005.
J. Zhou et al, Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISACS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
AZOTEQ, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, 2000 http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G.Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
Non-Final Office Action mailed on Dec. 19, 2011 in related U.S. Appl. No. 12/495,185.
Response to Non-Final Office Action filed in related U.S. Appl. No. 12/495,206 on Apr. 19, 2012.

* cited by examiner

LIGHT EMITTING DIODE BASED LIGHTING SYSTEM WITH TIME DIVISION AMBIENT LIGHT FEEDBACK RESPONSE

CROSS REFERENCE TO RELATED APPLICATIONS

This application claims the benefit under 35 U.S.C. §119(e) of U.S. Provisional Application No. 61/122,198, filed Dec. 12, 2008, and entitled "Single Photo-Detector for Color Balance of Multiple LED Sources". U.S. Provisional Application No. 61/122,198 includes exemplary systems and methods and is incorporated by reference in its entirety.

BACKGROUND OF THE INVENTION

1. Field of the Invention

The present invention relates in general to the field of lighting and signal processing, and more specifically to a system and method of time division light output sensing and adjustment for different spectra light emitting diodes.

2. Description of the Related Art

Light emitting diodes (LEDs) are becoming particularly attractive as main stream light sources in part because of energy savings through high efficiency light output and environmental incentives, such as the reduction of mercury. LEDs are a type of semiconductor devices and are driven by direct current. The brightness (i.e. luminous intensity) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the LEDs or by reducing the average current through duty cycle modulation.

FIG. 1 depicts lighting system 100, which includes lamp 102. Lamp 102 includes a light source 104 to generate artificial light 106. Light 106 reflects off the interior surface of the housing of lamp 102 and propagates through diffuser 108 to generate light 110. Lighting system 100 also includes an ambient light sensor 112 to facilitate light harvesting. Light harvesting involves supplementing artificial light 110 with natural light 114 and correlating adjustments in the artificial light with variations in the natural light. The physical location of ambient light sensor 112 is a matter of design choice. In at least one embodiment, ambient light sensor 112 is physically attached to the exterior of lamp 102. Location of ambient light sensor 112 on the exterior of the housing of lamp 102 assists in minimizing the contribution of artificial light 106 to the natural light 114 received by ambient light sensor 112. In at least one embodiment, ambient light sensor 112 is remotely located and communicates with controller 124 using any available communication technology.

Lamp 102 receives an alternating current (AC) voltage $V_{AC\_SUPPLY}$ from supply voltage source 116 terminals 118 and 120. The voltage source 116 is, for example, a public utility, and the AC supply voltage $V_{AC\_SUPPLY}$ is, for example, a 60 Hz/110 V line voltage in the United States of America or a 50 Hz/220 V line voltage in Europe.

Lighting system 100 includes a power control system 122 that includes controller 124 to control power provided to light source 104 and, thus, control the brightness of artificial light 110 generated by light source 104. Controller 124 generates control signal $CS_0$ and provides control signal $CS_0$ to lamp driver 126 to control power delivered by lamp driver 126 to light source 104. The particular configuration of lamp driver 126 is a matter of design choice and, in part, depends upon the configuration of light source 104. Light source 104 can be any type of light source, such as an incandescent, fluorescent, or LED based source. Lamp driver 126 provides power to light source 104 in accordance with control signal $CS_0$.

Ambient light sensor 112 generates sense signal $SEN_1$. Sense signal $SEN_1$ indicates the brightness of ambient light. Controller 124 causes lamp driver 126 to increase or decrease the brightness of artificial light 110 if the ambient light is respectively too low or too high.

Light harvesting by lighting system 100 does not accurately account for the brightness of light 110 because the ambient light sensed by ambient light sensor 112 includes a contribution by artificial light 110.

SUMMARY OF THE INVENTION

In one embodiment of the present invention, an apparatus includes a controller configured to couple to a sensor and a first light emitting diode (LED) of a lamp. The controller is further configured to reduce power to a first light emitting diode (LED) coupled to the controller and receive a signal from a sensor indicating a brightness of light received by the sensor while the power to the first LED is reduced. The controller is also configured to adjust the brightness of the first LED in accordance with a brightness related target value.

In another embodiment of the present invention, an apparatus includes a lamp having at least a first light emitting diode (LED). The apparatus also includes a sensor to sense brightness of received light. The apparatus further includes a controller coupled to the lamp and the sensor. The controller is configured to reduce power to the first LED and receive a signal from the sensor indicating the brightness of light received by the sensor while the power to the first LED is reduced. The controller is further configured to adjust the brightness of the first LED in accordance with a brightness related target value.

In a further embodiment of the present invention, a method for light harvesting includes reducing power to a first light emitting diode (LED). The method further includes receiving a signal indicating a brightness of light while the power to the first LED is reduced and adjusting the brightness of the first LED in accordance with a brightness related target value.

In another embodiment of the present invention, an apparatus for light harvesting includes means for reduce power to a first light emitting diode (LED). The apparatus further includes means for receiving a signal indicating a brightness of light while the power to the first LED is reduced and means for adjusting the brightness of the first LED in accordance with a brightness related target value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
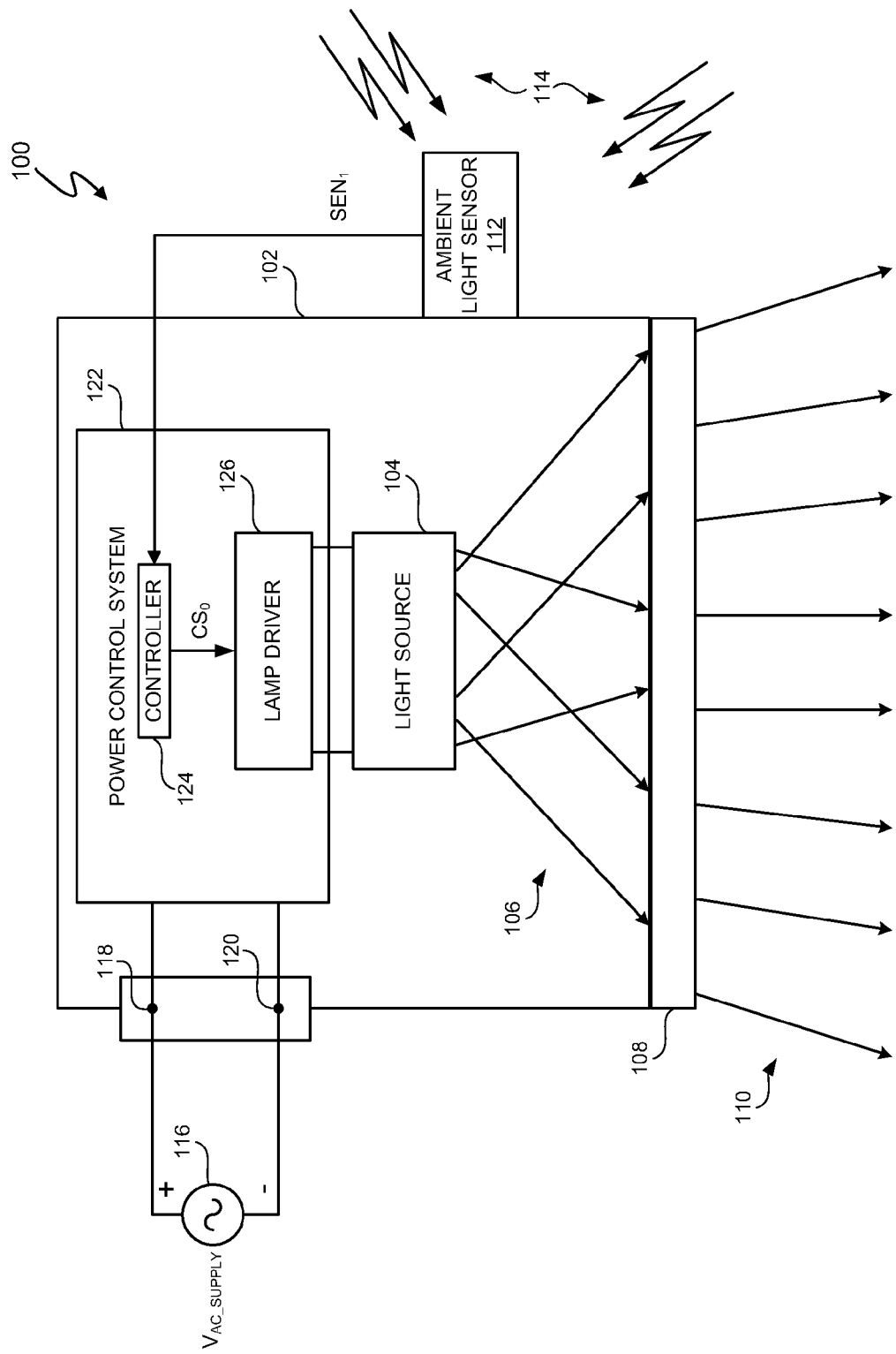
FIG. 1 (labeled prior art) depicts a lighting system for light harvesting.

In at least one embodiment, a lighting system includes time division light output sensing and adjustment for ambient light. In at least one embodiment, time division light output sensing involves modulating power to a set of LEDs, and the set of LEDs includes one or more LEDs. In at least one embodiment, each LED in the LED set is included in a single lamp, and, in at least one embodiment, the set of LEDs are contained in multiple lamps. In at least one embodiment, for each lamp, a controller modulates power to the LED set by selectively reducing current to the LED set using time division algorithm to allow a light sensor to sense the brightness of ambient light with a reduced contribution from the LED set. In at least one embodiment, power can be reduced to zero by reducing the current to zero, thus, turning each LED in the lamp "off" or can be reduced to a value greater than zero. In at least one embodiment, the controller compares the determined brightness of the ambient light against a target value for brightness and adjusts the brightness of the light emitted by the LED set to meet the target values.

In at least one embodiment, power modulation to multiple lamps is synchronized so that light from multiple lamps using one or more LEDs as a light source (referred to herein as "LED lamps") is reduced to allow one or more light sensors to sense ambient light with reduced (including eliminated) contribution by the LED lamps. The human eye generally takes 1-10 milliseconds (ms) to sense changes in light brightness. Light sensors can sense changes in light brightness in less than 1 ms. Thus, in at least one embodiment, current is reduced to the LEDs for 1 ms or less to allow the light sensor to sense ambient light without noticeable effect to the human eye.

In at least one embodiment, for lighting systems with multiple LEDs, in addition to sensing ambient light, a lighting system includes time division light output sensing and brightness adjustment for different spectra light emitting diodes (LEDs). In at least one embodiment, brightness of light emitted from multiple LEDs is adjusted by modifying power to subgroups of the multiple LEDs during different times and detecting the brightness of the LEDs during the reductions of power. In at least one embodiment, once the brightness of the LEDs are determined, a controller determines if the brightness meet target brightness values, and, if not, the controller adjusts each LED with the goal meet the target brightness values. In at least one embodiment, a process of modifying power to the subgroups of multiple LEDs over time and adjusting the brightness of the LEDs is referred as "time division and light output sensing and adjusting. Thus, in at least one embodiment, a lighting system includes time division light output sensing and adjustment for different spectrum light emitting diodes (LEDs).

In at least one embodiment, an LED set is a set of one or more LEDs whose brightness is collectively adjusted. For example, a first LED set could include four red LEDs, and a second LED set could include three blue LEDs. The brightness of each LED set can be collectively determined and adjusted. In at least one embodiment, time division light output sensing involves modulating power over time, e.g. changing current over time, to multiple LEDs to different subgroups of the LEDs. The number of LEDs in each subgroup is a matter of design choice and can be a single LED.

In at least one embodiment, a controller performs time division power modulation of the LEDs by modulating power to the LEDs by selectively reducing power for a limited duration of time to a subgroup of one or more LEDs having a spectrum of interest and repeating power reductions for each LED set having spectrums of interest using a time division algorithm. The time division power modulation allows the controller to determine a relative contribution to the brightness of the light received by one or more sensors for each LED set. In at least one embodiment, a controller correlates the different brightness of received light sensed during different times in accordance with the time division power modulation of the LEDs to determine the brightness of individual sets of LEDs. In at least one embodiment, a controller compares the determined brightness of individual sets of LEDs against target values and adjusts the brightness of the light emitted by the LEDs to meet the target values.

In at least one embodiment, the spectrum of light emitted by the LEDs is a matter of design choice. In at least one embodiment, the LEDs represent at least two different spectra. In at least one embodiment, the one or more sensors are photosensitive transistors and are calibrated to compensate for one or more variations in operating characteristics due to factors such as increasing operating temperatures.

Figure 2:
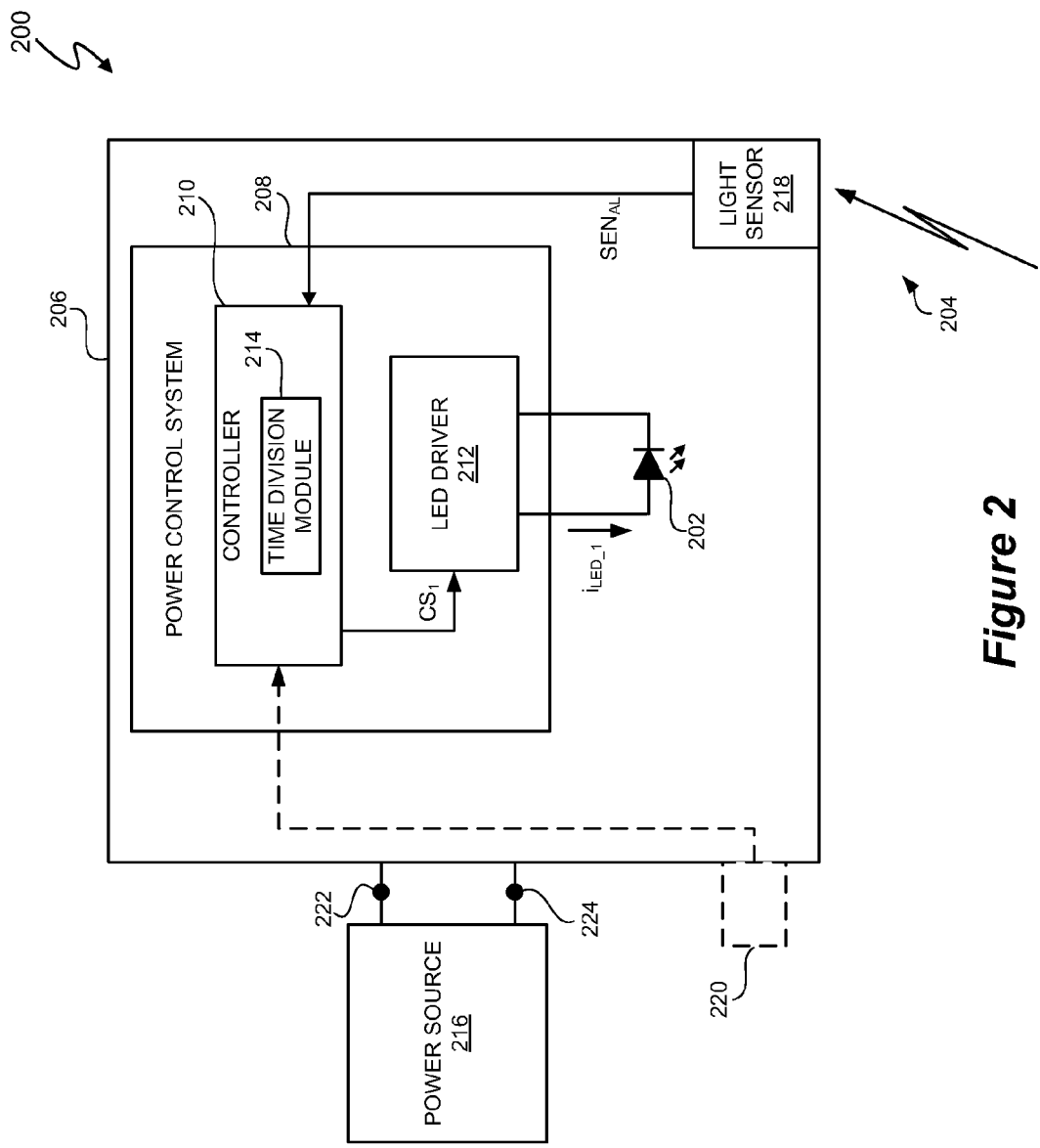
FIG. 2 depicts a lighting system with time division light output sensing and adjustment for light harvesting.

FIG. 2 depicts a lighting system 200 that, for example, facilitates light harvesting by adjusting power provided to LED set 202 to complement the brightness of sensed ambient light 204. LED set 202 includes one or more LEDs. The particular type and light spectrum of each LED in LED set 202 is a matter of design choice. The "spectrum" of an LED refers to the wavelength or wavelengths of light emitted by the LED. Wavelengths of light determine the color of the light. Thus, the spectrum of an LED refers to the color of light emitted by the LED. For example, in one embodiment, a blue-green spectrum LED 106 emits blue-green light, and a red spectrum LED 108 emits red light. For example, the light spectrum of LED set 202 can be red, green, blue, amber, white, and so on including any combination of the foregoing colors. Lamp 206 of lighting system 200 includes a power control system 208. Power control system 208 includes controller 210 and LED driver 212 to control LED drive current $i_{LED\_1}$. The brightness of LED set 202 is directly proportional to the LED drive current $i_{LED\_1}$. Controller 210 includes a time division module 214 to facilitate time division power modulation to sense ambient light 204 with reduced contribution by LED set 202. In at least one embodiment, time division power modulation refers to changing power provided to one or more LEDs for a period of time. Lamp 206 receives power from power source 216. Power source 216 can be any power source, such as the AC voltage supply 110 (FIG. 1).

Light sensor 218 senses the brightness of light reaching light sensor 218 and generates a sense signal $SEN_{AL}$. Sense signal $SEN_{AL}$ represents the brightness of light sensed by light sensor 218. Light sensor 218 provides the sense signal $SEN_{AL}$ to controller 210. As subsequently described in more detail, in at least one embodiment, controller 210 utilizes sense signal $SEN_{AL}$ to adjust the brightness of LED set 202. Light sensor 218 can be any type of light sensor. In at least one embodiment, light sensor 218 is a phototransistor or photodiode based light sensor that can sense the brightness of light received by the light sensor 218 in 1 ms or less. Lamp user interface 220 is an optional component of lighting system 200 that provides a target parameter to controller 210 to set the value of target data for adjusting the brightness of LED set 202. In at least one embodiment, lamp user interface 220 is an integrated part of lamp 206. The physical disposition of power control system 208, LED set 202, and light source 218 is a matter of design choice. In at least one embodiment, lamp 206 encloses power control system 208, LED set 202, and light sensor 218. In at least one embodiment, lamp 206 includes a diffuser at the base lamp 206 to soften and mix light provided by LED set 202. Light sensor 218 can be any type of light sensor that can produce sense signal $SEN_{AL}$. In at least one embodiment, light sensor 218 is a photo-diode or phototransistor based light sensor.

Figure 3:
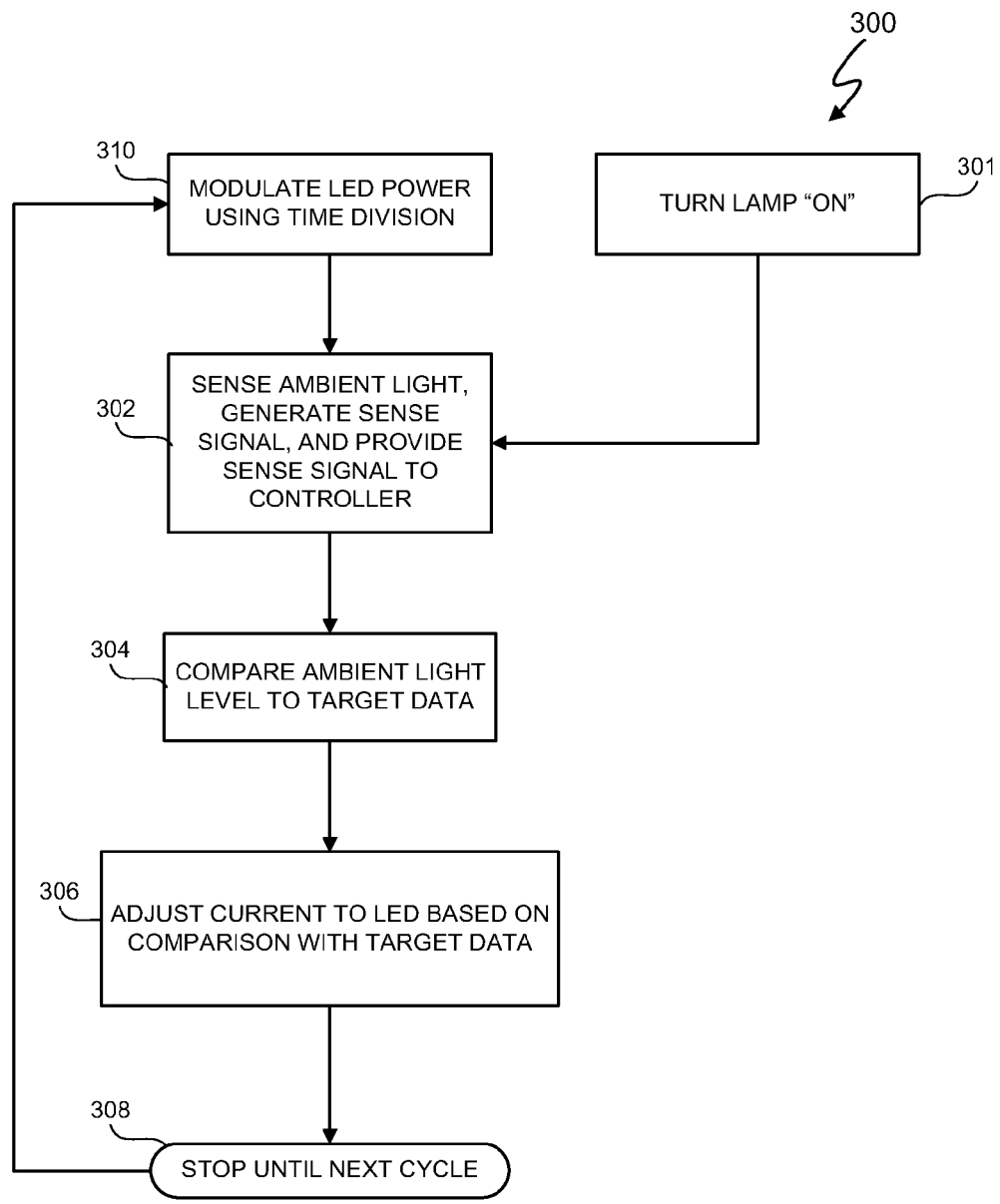
FIG. 3 depicts a time division algorithm for light harvesting.

FIG. 3 depicts a time division algorithm 300 for light harvesting that represents one embodiment of an algorithm to allow controller 210 (FIG. 2) to perform time division power modulation to sense ambient light. The particular implementation of controller 210 and time division algorithm 300 is a matter of design choice. Controller 210 can be implemented using digital, analog, or digital and analog technology. In at least one embodiment, controller 210 is fabricated as an integrated circuit. In at least one embodiment, controller 210 includes a processor and time division algorithm 300 is implemented in code and executed by the processor. The code can be stored in a memory (not shown) included in controller 210 or accessible to controller 210.

Figure 4:
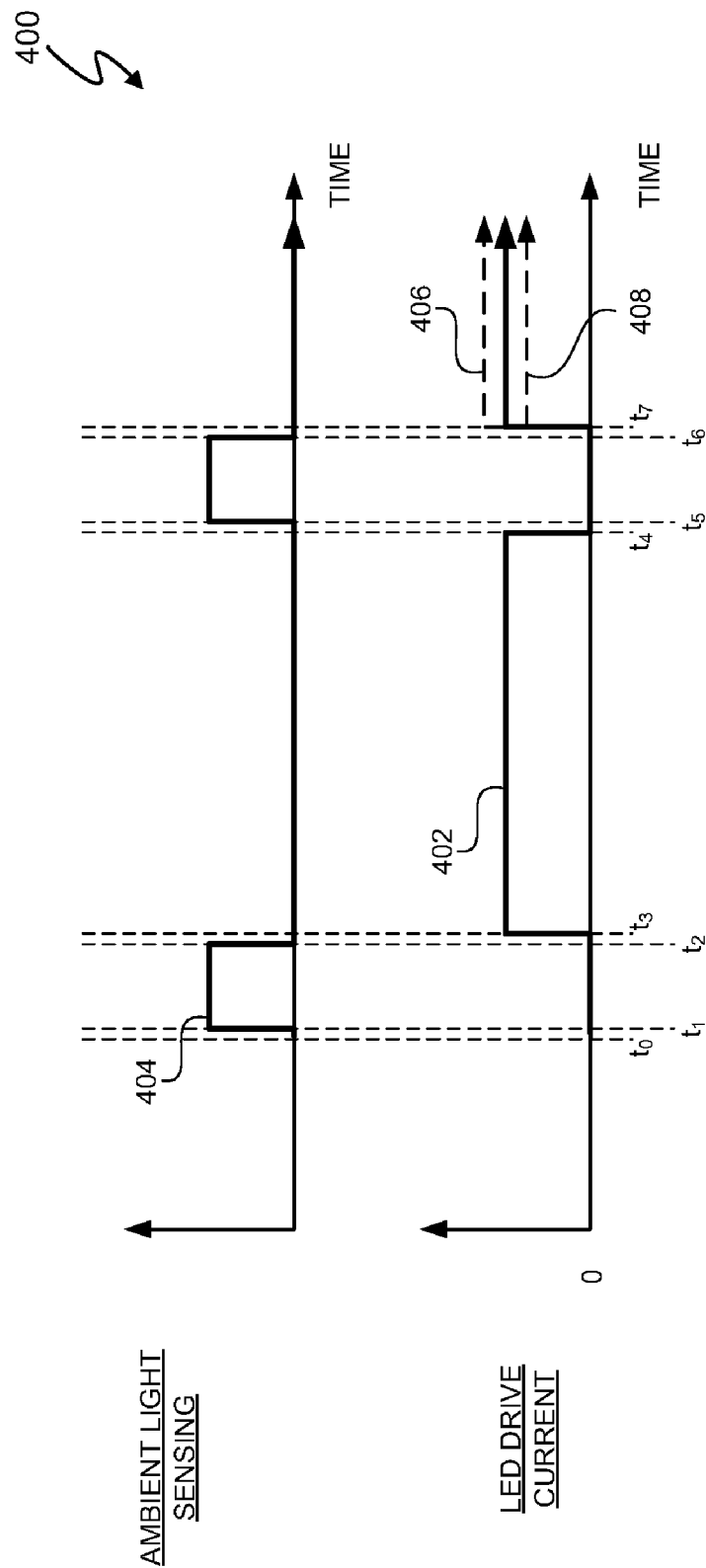
FIG. 4 depicts a light sensing/drive current modulation timing diagram.

FIG. 4 depicts a light sensing/drive current modulation timing diagram 400 that represents one embodiment of a power modulation and ambient light sensing timing diagram utilized by time division module 214 of controller 210.

Referring to FIGS. 2, 3, and 4, in at least one embodiment, for more advanced light harvesting controller 210 utilizes time division algorithm 300 in accordance with light sensing/drive current modulation timing diagram 400 to adjust the brightness of LED set 202 to complement ambient light 204. In operation 301, at time $t_0$, the lamp 206 is turned "on" by applying power from power source 216 to lamp 206. When the lamp is initially turned "on" at time $t_0$, between times $t_0$ and $t_3$ controller 210 sets the LED drive current $i_{LED\_1}$ to a predetermined value. In at least one embodiment, the predetermined value is zero as shown in the LED drive current timeline 402. The predetermined value of the LED drive current $i_{LED\_1}$ can be any value that corresponds with a known brightness of LED set 202.

In operation 302, between times $t_1$ and $t_2$, light sensor 218 senses ambient light 204 received by light sensor 218 and generates sense signal $SEN_{AL}$ as indicated in the ambient light sensing timeline 404. Light sensor 218 provides sense signal $SEN_{AL}$ to controller 206. After receiving sense signal $SEN_{AL}$, in operation 304, controller 210 compares the value of ambient light represented by sense signal $SEN_{AL}$ to target data. The target data is set so that a comparison of the target data with the ambient light value indicates whether controller 210 should adjust the LED drive current $i_{LED\_1}$ by increasing or decreasing the LED drive current $i_{LED\_1}$. In at least one embodiment, if LED drive current $i_{LED\_1}$ is zero between times $t_0$ and $t_3$, the target data represents a desired brightness of artificial light generated by LED set 202 plus natural light. If the LED drive current $i_{LED\_1}$ is not set to zero between times $t_0$ and $t_3$, LED set 202 contributes to the brightness of light received by light sensor 218 and, thus, the contribution is represented in sense signal $SEN_{AL}$. Thus, if the LED drive current $i_{LED\_1}$ is not set to zero, controller 210 compensates for the contribution of LED set 202 to the brightness of the ambient light 204 represented by sense signal $SEN_{AL}$ in order to determine any adjustment for LED drive current $i_{LED\_1}$. In at least one embodiment, to compensate for the contribution of LED set 202, the target data compared to the sense signal $SEN_1$ includes a known contribution of the brightness of LED set 202. Thus, comparing the target data to sense signal $SEN_1$ negates the contribution of LED set 202 to the ambient light represented by sense signal $SEN_1$.

The brightness level of natural light plus artificial light represented in the target data can be stored in a memory (not shown) accessible to controller 210 or can be communicated to controller 210. In at least one embodiment, lamp user interface 220 is a manual entry device that allows a user to set target data representing a desired brightness level of natural light plus artificial light. For example, in at least one embodiment, lamp user interface 220 is a digital device that allows the user to enter a setting corresponding to the desired brightness level. In at least one embodiment, lamp user interface 220 is a potentiometer having a resistance that indicates a desired brightness level. In at least one embodiment, the brightness level is received via a separate wired or wireless connection from a remote input device (not shown), such as a dimmer or a remotely located lamp user interface 220. In at least one embodiment, the connection is dedicated for communication with lamp 206. In at least one embodiment, a dimmer signal is received via terminals 222 and 224, and controller 210 interrupts a dimming level indicated by the dimmer signal as a brightness level for the target data. The dimmer signal can be any type of dimmer signal, such as a phase modified signal from a conventional triac based dimmer.

In operation 306, controller 210 adjusts LED current $i_{LED\_1}$ to adjust the brightness of LED set 202 to achieve a target brightness of artificial light plus natural light. In at least one embodiment, if sense signal $SEN_1$ indicates that the ambient light brightness has increased, controller 210 decreases the value of LED current $i_{LED\_1}$ so that the brightness of LED set 202 is decreased by the same amount of the increase in ambient light brightness. Likewise, if sense signal $SEN_1$ indicates that the ambient light brightness has decreased, controller 210 increases the value of LED current $i_{LED\_1}$ so that the brightness of LED set 202 is increased by the same amount of the decrease in ambient light brightness. Operation 306 can include an integration function so that adjustments to LED drive current $i_{LED\_1}$ are integrated over time to reduce perceptions of changes in brightness of LED set 202 by a human eye.

Operation 308 stops time division algorithm 300 until a time to perform operation 310 and repeat operations 302-308 is reached. The frequency of repeating time division algorithm 300 is a matter of design choice. In at least one embodiment, time division algorithm 300 is repeated every second. In at least one embodiment, time division algorithm 300 is repeated often enough to sense changes in the ambient light and changes in the brightness of LED set 202 so that the adjustments to the brightness of light emitted from LED set 202 is virtually imperceptible to a human eye. In at least one embodiment, time division algorithm 300 is repeated in multiples of 8.3 ms or 10 ms, which represent respective periods of rectified 60 Hz and 50 Hz public utility supply voltages.

In operation 310, at time $t_4$ of FIG. 4, time division module 214 causes controller 210 to reduce LED drive current $i_{LED\_1}$ to zero (as shown in the LED drive current timeline 402 or to a value greater than zero as previously described). At time $t_5$ and $t_6$, operation 302 repeats so that light sensor 218 senses the brightness of light received by light sensor 218 between times $t_5$ and $t_6$. Between times $t_6$ and $t_7$, controller 210 repeats operations 304 and 306. LED drive current line 406 indicates an increase in LED drive current $i_{LED\_1}$ when the ambient light detected by light sensor 218 decreases between times $t_2$ and $t_5$. LED drive current line 408 indicates a decrease in LED drive current $i_{LED\_1}$ when the ambient light detected by light sensor 218 increases between times $t_2$ and $t_5$.

Controller 210 generates control signal $CS_1$ in any of a variety of ways. U.S. patent application Ser. No. 11/864,366, entitled "Time-Based Control of a System having Integration Response," inventor John L. Melanson, and filed on Sep. 28, 2007 describes an exemplary system and method for generating a control signal which can be used for driving current for an LED. U.S. patent application Ser. No. 11/864,366 is referred to herein as "Melanson II" and is incorporated by reference in its entirety. U.S. patent application Ser. No. 12/415,830, entitled "Primary-Side Based Control Of Secondary-Side Current For An Isolation Transformer," inventor John L. Melanson, and filed on Mar. 31, 2009 also describes an exemplary system and method for generating a control signal which can be used for driving current for an LED. U.S. patent application Ser. No. 12/415,830 is referred to herein as "Melanson III" and is incorporated by reference in its entirety. In at least one embodiment, controller 210 is implemented and generates control signal $CS_1$ in the same manner as the generation of a control signal described in Melanson II or Melanson III with the exception of the operation of time division module 214 as subsequently described. In at least one embodiment, controller 210 controls the LED drive current $i_{LED1}$ using linear current control.

Figure 5:
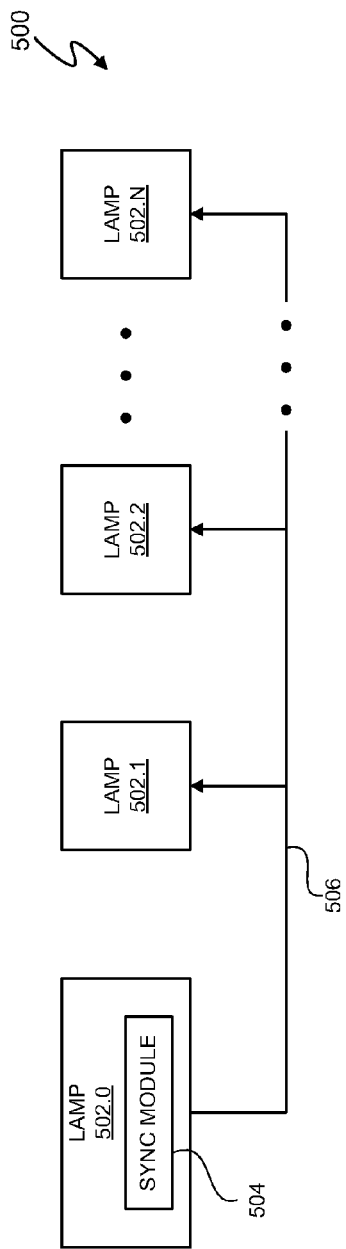
FIGS. 5, 6, and 7 depict respective lighting systems with multiple lamps and synchronization schemes.

FIG. 5 depicts a lighting system 500 having N+1 number of lamps 502.0-502.N, and "N" is an integer greater than or equal to 1. In at least one embodiment, each of lamps 502.0-502.N are identical to lamp 206 with an exception for lamp 502.0 as subsequently discussed. Lamps 502.0-502.N perform time division algorithm 300. To sense the brightness of ambient light without an unknown contribution from one or more of lamps 502.0-502.N, lamp 502.0 includes a synchronization module 504 to synchronize modulation of LED power using time division and sensing ambient light in respective operations 310 and 302. In at least one embodiment, lamp 502.0 sends a synchronization signal via signal path 506 to lamps 502.1-502.N so that lamps 502.0-502.N utilize output remapping-delta-sigma modulator module 400 with synchronized timing. By using synchronized timing, lamps 502.0-502.N perform time division algorithm 300 at the same time, and none of lamps 502.0-502.N contribute an unknown brightness of light to sensed ambient light.

Figure 6:
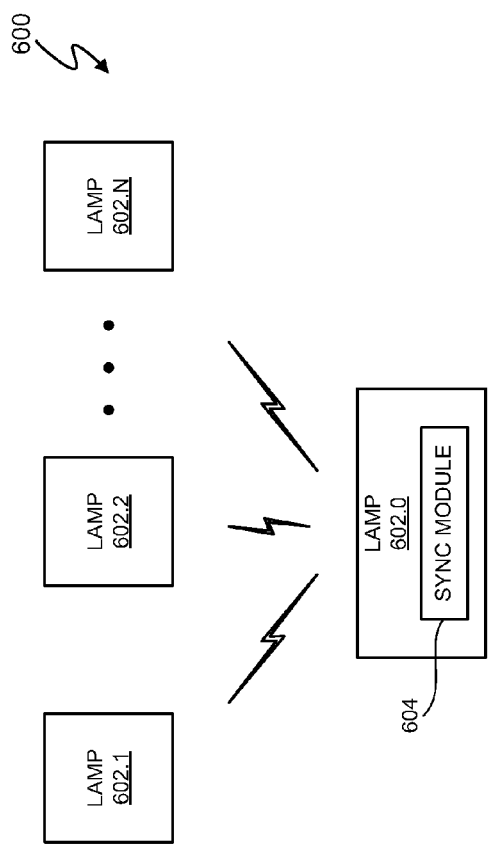

FIG. 6 depicts a lighting system 600 having N+1 number of lamps 602.0-602.N, and "N" is an integer greater than or equal to 1. In at least one embodiment, each of lamps 602.0-602.N is identical to lamp 206 with an exception for lamp 602.0 as subsequently discussed. Lamps 602.0-602.N perform time division algorithm 300. To sense the brightness of ambient light without an unknown contribution from one or more of lamps 602.0-602.N, lamp 602.0 includes a synchronization module 604 to synchronize modulation of LED power using time division and sensing ambient light in respective operations 310 and 302. In at least one embodiment, lamp 602.0 sends a synchronization signal via a wireless signal to lamps 602.1-602.N so that lamps 602.0-602.N utilize output remapping-delta-sigma modulator module 400 with synchronized timing. In at least one embodiment, lamp 602.0 sends a synchronization signal by modulating the brightness of light emitted from lamp 602.0, and lamps 602.1-602.N are configured to sense the brightness modulation and utilize the brightness modulation as a synchronization signal so that lamps 602.0-602.N utilize output remapping-delta-sigma modulator module 400 with synchronized timing. By using synchronized timing, lamps 602.0-602.N perform time division algorithm 300 at the same time, and none of lamps 602.0-602.N contribute an unknown brightness of light to sensed ambient light.

Figure 7:
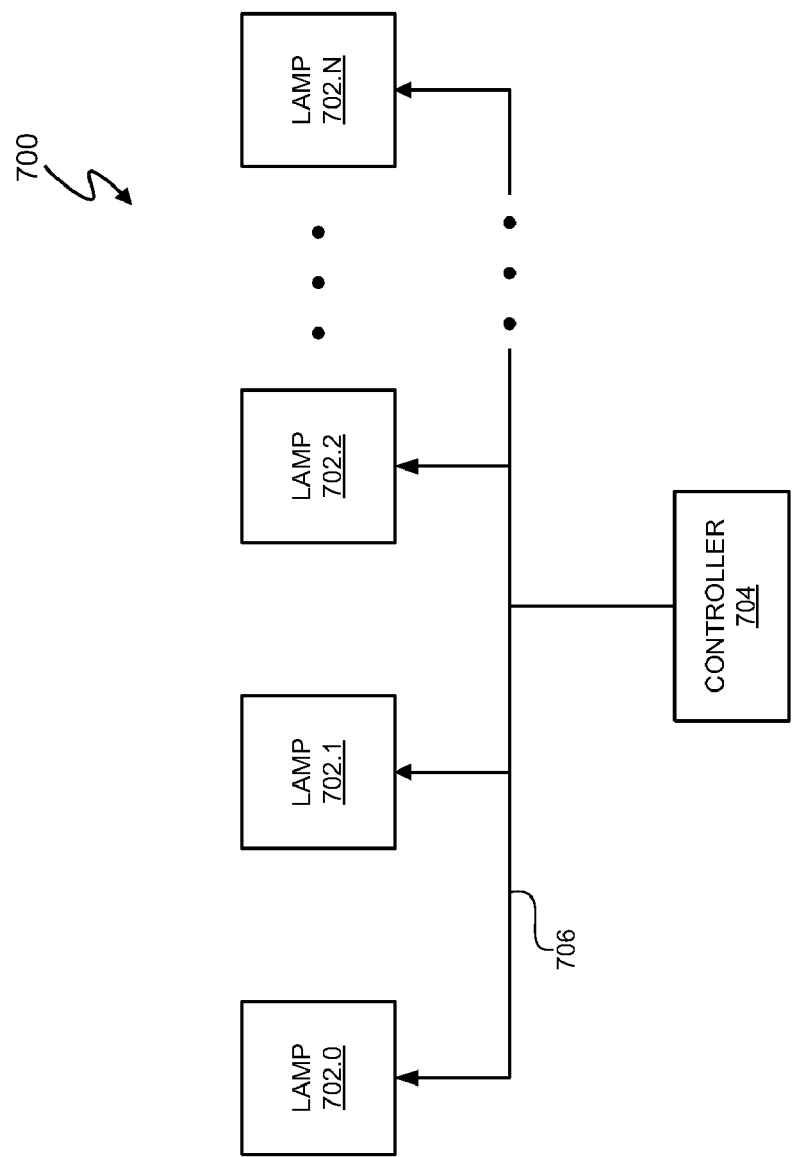

FIG. 7 depicts a lighting system 700 having N+1 number of lamps 702.0-702.N, and "N" is an integer greater than or equal to 1. In at least one embodiment, each of lamps 702.0-702.N is identical to lamp 206. Lamps 702.0-702.N perform time division algorithm 300. To sense the brightness of ambient light without an unknown contribution from one or more of lamps 702.0-702.N, controller 704 sends a synchronization signal to lamps 702.0-702.N via signal path 706 to synchronize modulation of LED power using time division and sensing ambient light in respective operations 310 and 302. In at least one embodiment, lamps 702.0-702.N utilize output remapping-delta-sigma modulator module 400 with synchronized timing. By using synchronized timing, lamps 702.0-702.N perform time division algorithm 300 at the same time, and none of lamps 702.0-702.N contribute an unknown brightness of light to sensed ambient light. In at least one embodiment, signal path 706 is the supply voltage signal path, and controller 704 uses a protocol, such as the X10 protocol, to send the synchronization signal to lamps 702.0-702.N. In at least one embodiment, controller 704 can also send the synchronization signal via a wireless signal. Synchronization of multiple lamps, such as multiple copies of lamp 206 can be accomplished in many other ways as well. The particular synchronization process is a matter of design choice.

Figure 8:
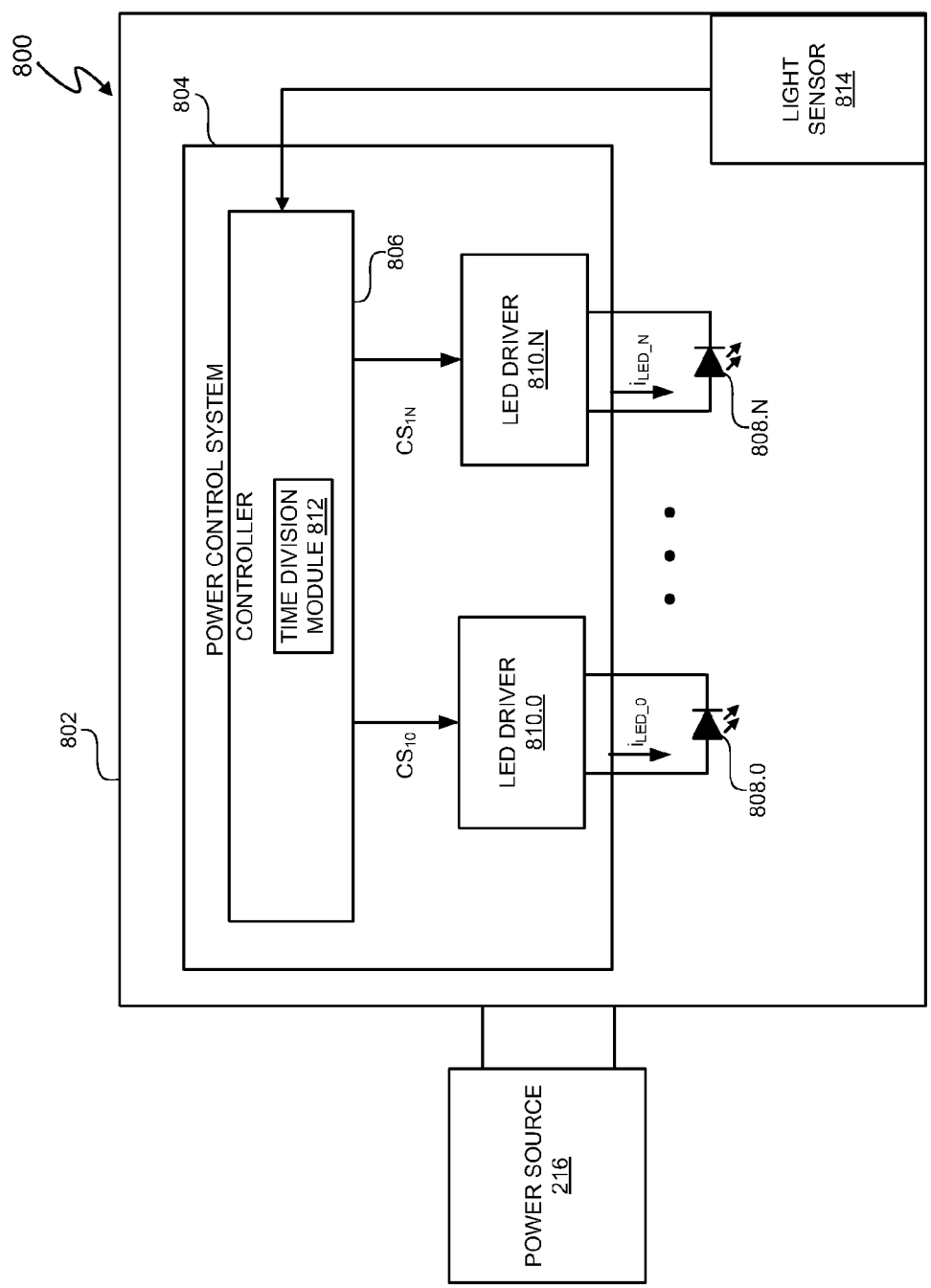
FIG. 8 depicts a lighting system with time division light output sensing and brightness adjustment for different spectrum light emitting diodes.

FIG. 8 depicts lighting system 800 which includes lamp 802. Lamp 802 includes N+1 LEDs 808.0-808.N driven by separate, respective LED drivers 810.0-810.N. "N" is an integer greater than or equal to one. Lamp 802 includes controller 806 with time division module 812 to generate control signals $CS_{10}$-$CS_{1N}$ to control respective LED drivers 810.0-810.N and, thus, control respective LED drive currents $i_{LED\_0}$-$i_{LED\_N}$. In at least one embodiment, controller 806 and time division module 812 of power control system 804 are identical to respective controller 210 and time division module 214 except controller 806 generates a separate control signal for each of LED drivers 810.0-810.N. Each of LED drivers 810.0-810.N provides respective LED drive currents $i_{LED\_0}$-$i_{LED\_N}$ to respective LED sets 808.0-808.N. LED sets 808.0-808.N can be any combination of LED color to generate a virtually limitless variety of spectra. Each of LED sets 808.0-808.N includes one or more LEDs. In at least one embodiment, controller 806 utilizes time division algorithm and output remapping-delta-sigma modulator module 400 for light harvesting.

In addition to light harvesting, in at least one embodiment, lighting system 800 includes time division light output sensing and adjustment for different spectra light emitting diodes.

Lighting system 800 includes a power control system 802 that, in at least one embodiment, receives power from power source 216.

In at least one embodiment, each LED in an LED set 808 has approximately the same light spectrum. The particular spectrum is a matter of design choice and includes red, blue, amber, green, blue-green, and white.

Lighting system 800 includes a light sensor 814 to sense the brightness of light received by light sensor 814. In at least one embodiment, light sensor 814 is a single, broad spectrum light sensor that senses all the spectra of light emitted by LED sets 808.0-808.N. The physical location of light sensor 814 is a matter of design choice.

Controller 806 includes time division module 812 to, for example, selectively modulate power to LED sets 808.0-808.N to allow controller 806 to determine the brightness of at least two of the LED sets 808.0-808.N. In at least one embodiment, controller 806 decreases power to LED sets 808.0-808.N in accordance with a time division algorithm that allows controller 806 to determine the brightness of light 816 emitted from at least two of the LED sets 808.0-808.N. The controller 806 decreases power to different subgroups of the LED sets to allow the controller to determine the brightness of individual LED sets. Embodiments of the time division algorithm are discussed in more detail below.

The particular implementation of controller 806 is a matter of design choice. Controller 806 can be implemented using digital, analog, or digital and analog technology. In at least one embodiment, controller 806 is fabricated as an integrated circuit. In at least one embodiment, controller 806 includes a processor and algorithms performed by controller 806 are implemented in code and executed by the processor. The code can be stored in a memory (not shown) included in controller 806 or accessible to controller 806.

Figure 9:
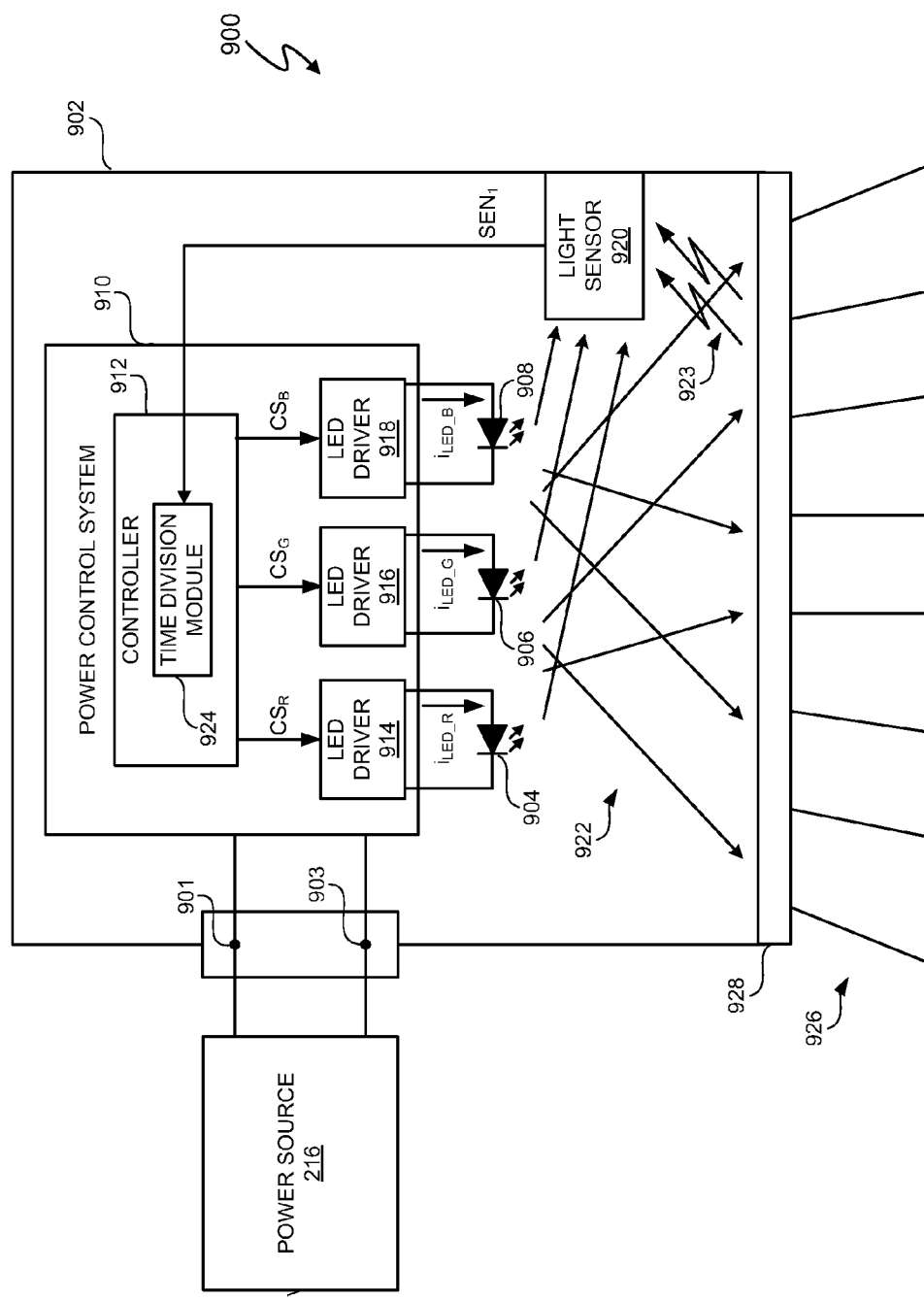
FIG. 9 depicts an embodiment of the lighting system of FIG. 8.

FIG. 9 depicts lighting system 900, which represents one embodiment of lighting system 300. Lamp 902 receives power from power source 304 via terminals 901 and 903. Lamp 902 includes LED 904, LED 906, and LED 908, which have different respective spectra. For purposes of description, LED 904, LED 906, and LED 908 will be discussed as respectively red, green, and blue LEDs, i.e. LED 904 emits red spectrum light, LED 906 emits green spectrum light, and LED 908 emits blue spectrum light. Lamp 902 also includes a power control system 910, which represents one embodiment of power control system 302. Power control system 910 includes controller 912 to control LED drivers 914, 916, and 918 and, thereby, control respective LED drive currents $i_{LED\_R}$, $i_{LED\_G}$, and $i_{LED\_B}$. In at least one embodiment, controller 912 generates control signals $CS_R$, $CS_G$, and $CS_B$ in the same manner that controller 306 generates control signals $CS_{10}$-$CS_{1N}$ with N=2. Controller 912 represents one embodiment of controller 306.

Lighting system 900 also includes a light sensor 920 to sense incoming light 922 from LEDs 904, 906, and 908 and ambient light 923 and generate a sense signal $SEN_1$. Ambient light 923 represents light that is received by light sensor 920 but not generated by LEDs 904, 906, and 908. In at least one embodiment, ambient light 923 represents light from other artificial light sources or natural light such as sunlight. In at least one embodiment, light sensor 314 is a broad spectrum sensor that senses light 922 from LEDs 904, 906, and 908 and senses ambient light 923.

The human eye generally cannot perceive a reduction in brightness from a light source if the reduction has a duration of 1 millisecond (ms) or less. Thus, in at least one embodiment, power, and thus, brightness, is reduced to LEDs 904, 906, and 908 in accordance with a time division power modulation algorithm for 1 ms or less, and light sensor 920 senses light whose brightness is reduced for 1 ms or less and generates sense signal $SEN_1$ to indicate the brightness of light 922 received by light sensor 920. In at least one embodiment, light sensor 920 is any commercially available photosensitive transistor-based or diode-based light sensor that can detect brightness of light and generate sense signal $SEN_1$. The particular light sensor 920 is a matter of design choice. Controller 912 includes a time division module 924. As subsequently explained in more detail, time division module 924 in conjunction with LED drivers 914, 916, and 918 selectively modulates drive currents $i_{LED\_R}$, $i_{LED\_G}$, and $i_{LED\_B}$ in accordance with a time division algorithm that allows controller 912 to determine the individual brightness of LEDs 904, 906, and 908. By determining the individual brightness of LEDs 904, 906, and 908, in at least one embodiment, controller 912 individually adjusts drive currents $i_{LED\_R}$, $i_{LED\_G}$, and $i_{LED\_B}$ to obtain a target brightness of light emitted from respective LEDs 904, 906, and 908.

Figure 10:
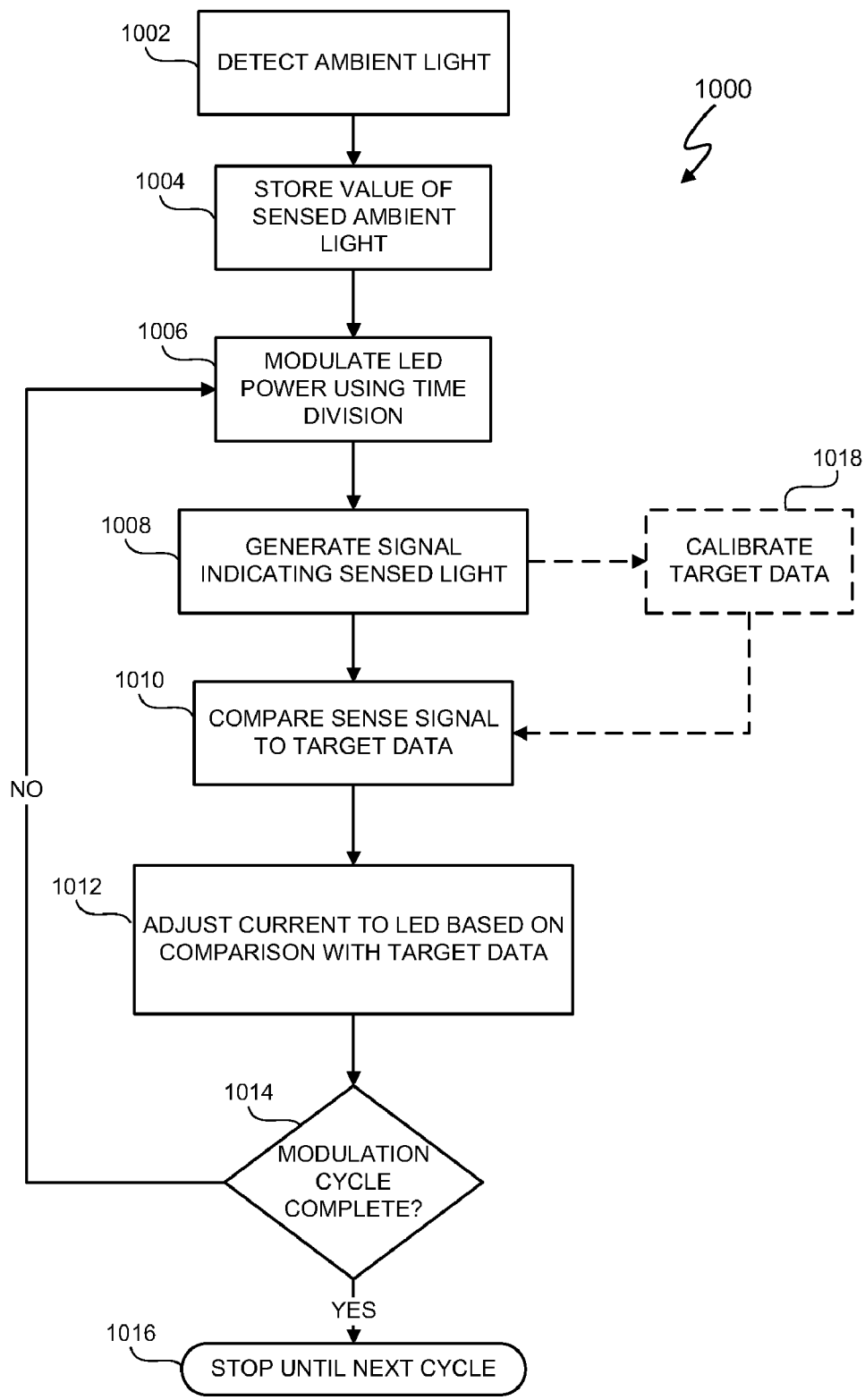
FIG. 10 depicts a time division and adjustment algorithm for sensing and adjusting the brightness of light in the lighting system of FIG. 9.

FIG. 10 depicts an exemplary time division sensing and LED adjustment algorithm 1000 (referred to herein as the "time division and adjustment algorithm 1000") for sensing and adjusting the brightness of light emitted by LEDs 904, 906, and 908 of lighting system 900. In general, time division and adjustment algorithm 1000 obtains a brightness value for ambient light and reduces the brightness of subgroups of LEDs 904, 906, and 908 over time, determines the brightness of each of LEDs 904, 906, and 908.

Figure 11:
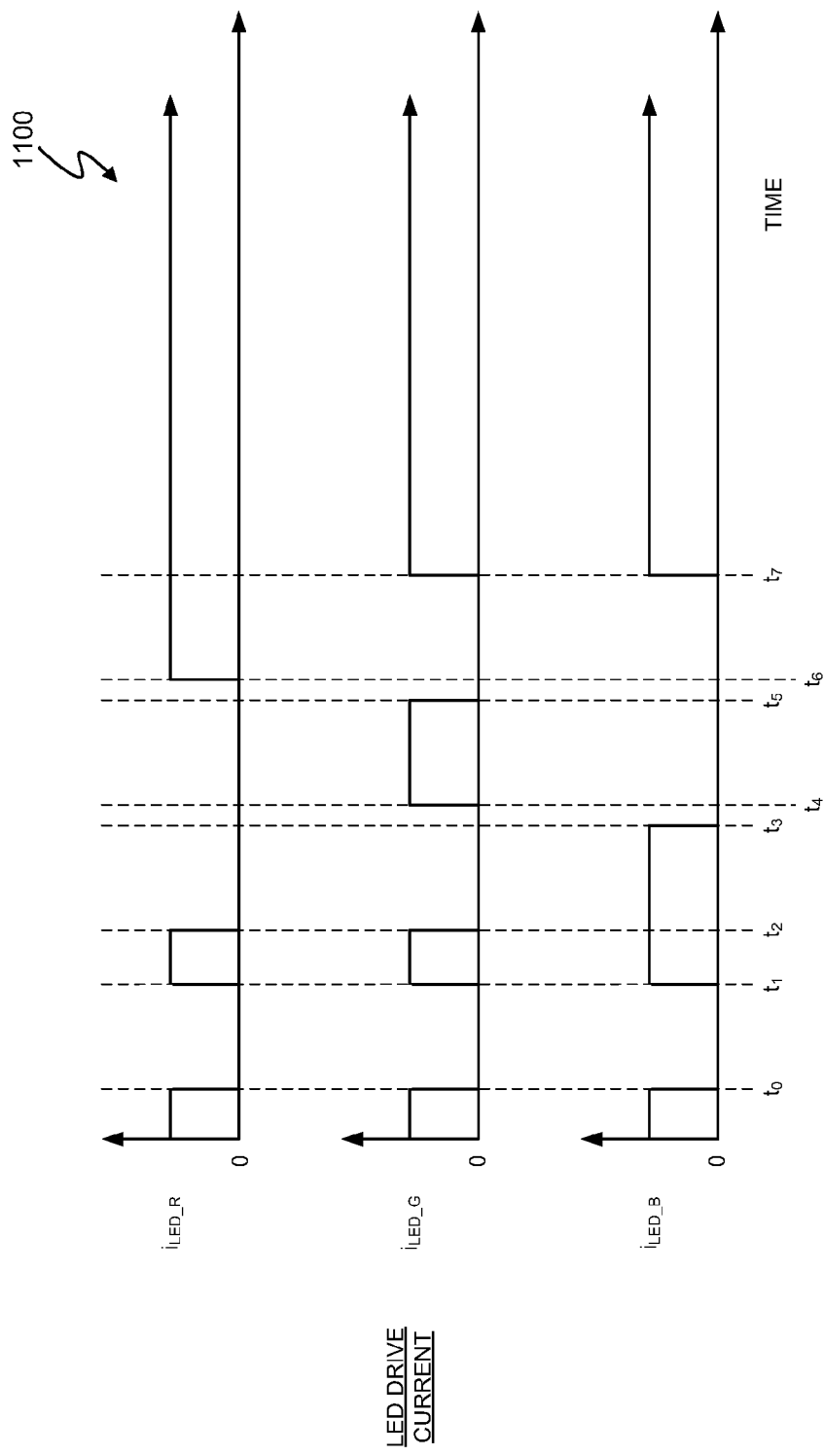
FIG. 11 depicts an LED drive current signal timing diagram which illustrates an interspacing time division for the algorithm of FIG. 10.

FIG. 11 depicts interspacing time division 1100 for power modulation of LEDs 904, 906, and 908 (FIG. 9). In general, in interspacing time division 1100, ambient light brightness is determined by reducing power to all of LEDs 904, 906, and 908, then current, and, thus, brightness, is reduced to two of LEDs 904, 906, and 908 at a time until the brightness of light from each of LEDs 904, 906, and 908 plus ambient light is sensed. Since the ambient light brightness is known, controller 912 can determine the individual brightness of light from each of LEDs 904, 906, and 908, compare each brightness to target data, and adjust the brightness of light from each of LEDs 904, 906, and 908 in accordance with results of the comparison. In at least one embodiment, the brightness of light from each of LEDs 904, 906, and 908 is adjusted by increasing or decreasing current to the LEDs 904, 906, and 908. Increasing current increases brightness, and decreasing current decreases brightness. In interspacing time division 1100 power to the LEDs 904, 906, and 908 is reduced to zero. However, the particular amount of reduction is a matter of design choice.

Referring to FIGS. 9, 10, and 11, an exemplary operation of lighting system 900 involves time division and adjustment algorithm 1000 and interspacing time division 1100. In at least one embodiment, to sense the brightness of light emitted from each of LEDs 904, 906, and 908, in operation 1002, lighting system 900 senses ambient light 923. In at least one embodiment, ambient light is light received by light sensor 920 that is not emitted by LEDs 904, 906, or 908. To sense only the ambient light, between times $t_0$ and $t_1$, LED drive currents $i_{LED\_R}$, $i_{LED\_G}$, and $i_{LED\_B}$ are reduced to zero, thereby turning "off" LEDs 904, 906, or 908. Light sensor 920 senses the ambient light between times $t_0$ and $t_1$ and generates signal $SEN_1$, which is representative of the amount of ambient light 923 sensed by light sensor 920. In operation 1004, controller 912 stores a value of sensed ambient light indicated by signal $SEN_1$. In operation 1006, the time division module 924 modulates power to LEDs 904 and 906 by causing LED drivers 914 and 916 to reduce drive currents $i_{LED\_R}$ and $i_{LED\_G}$ to zero between times $t_2$ and $t_3$. Light sensor 920 senses the ambient light 923 and light emitted by LED 908 and, in operation 1008, generates sense signal $SEN_1$ to indicate a brightness value of the sensed light.

As previously discussed, the human eye generally cannot perceive a reduction in brightness from a light source if the reduction has a duration of 1 millisecond (ms) or less. Thus, in at least one embodiment, each time division of power to LEDs 904, 906, and 908 as indicated by the LED drive current reduction times $t_0$-$t_1$, $t_2$-$t_3$, $t_4$-$t_5$, and $t_6$-$t_7$ in time division and adjustment algorithm 1000 has a duration of 1 ms or less so that turning LEDs 904, 906, and 908 "off" and "on" during time division and adjustment algorithm 1000 is imperceptible to a human.

In operation 1010, controller 912 compares values of the sense signal to values of target data. The target data includes a target brightness value for sense signal $SEN_1$ in which the target brightness value is representative of a target brightness for the combination of the ambient light and light emitted from the blue LED 908. In operation 1012, controller 912 adjusts the LED drive current $i_{LED\_B}$ based on the comparison between the target brightness value and the brightness value indicated by sense signal $SEN_1$. If the comparison indicates that the brightness of LED 908 is low, controller 912 increases the drive current $i_{LED\_B}$. If the comparison indicates that the brightness of LED 908 is high, controller 912 decreases the drive current $i_{LED\_B}$. Determining the amount and rate of change to drive current $i_{LED\_B}$ is a matter of design choice. In at least one embodiment, the amount of drive current $i_{LED\_B}$ change is determined based on the brightness-to-current relationship of LED 908 and the difference between the target brightness value and the brightness value of the sensed light indicated by sense signal $SEN_1$. In at least one embodiment, the rate of change for drive current $i_{LED\_B}$ is low enough, e.g. less than 1 ms, to prevent an instantaneously noticeable change by a human.

Controller 912 adjusts the drive current $i_{LED\_B}$ by adjusting control signal $CS_B$ provided to lamp driver 918. In at least one embodiment, controller 912 generates control signal $CS_B$ in accordance with Melanson II or Melanson III so that lamp driver 918 provides a desired drive current $i_{LED\_B}$.

In operation 1014, controller 912 determines if operations 1006-1012 have been completed for all LEDs 904, 906, and 908. If not, the time division and adjustment algorithm 1000 returns to operation 1006 and repeats operations 1006-1012 for the next LED. In the currently described embodiment, in operation 1006, time division module 924 reduces drive currents $i_{LED\_R}$ and $i_{LED\_B}$ to zero between times $t_4$ and $t_5$. Operations 1008-1012 then repeat to adjust drive current $i_{LED\_G}$ as indicated by operation 1012. Again, in operation 1014, controller 912 determines if operations 1006-1012 have been completed for all LEDs 904, 906, and 908. In the currently described embodiment, in operation 1006, time division module 924 reduces drive currents $i_{LED\_G}$ and $i_{LED\_B}$ to zero between times $t_6$ and $t_7$. Operations 1008-1012 then repeat to adjust drive current $i_{LED\_R}$ as indicated by operation 1012. After performing operations 1008-1012 for LEDs 904, 906, and 908, time division and adjustment algorithm 1000 proceeds from operation 1014 to operation 1016. Operation 1016 causes time division and adjustment algorithm 1000 to stop until the next cycle. The next cycle repeats operations 1002-1016 as previously described to reevaluate the brightness of light from LEDs 904, 906, and 908.

The frequency of repeating time division and adjustment algorithm 1000 is a matter of design choice and can be, for example, on the order of one or more seconds, one or more minutes, one or more hours, or one or more days. In at least one embodiment, time division and adjustment algorithm 1000 is repeated every second. In at least one embodiment, time division and adjustment algorithm 1000 is repeated often enough to sense changes in the ambient light and changes in the brightness of LEDs 904, 906, and 908 so that the brightness of light 926 exiting diffuser 928 is a constant or at least approximately constant value. Additionally, the timing between each period of power modulation, e.g. between times $t_1$ and $t_2$, $t_3$ and $t_4$, and so on is a matter of design choice. The particular choice is, for example, long enough to perform operations 1006-1014 for an LED before repeating operations 1006-1014 for the next LED.

In at least one embodiment, the brightness of only a subset of LEDs 904, 906, and 908 are considered during operations 1006-1012. For example, if the red LED 904 is assumed to maintain a relatively constant brightness over time, then the modulation of power of LEDs 906 and 908 between times $t_6$ and $t_7$ in operation 1006 and subsequent processing in operations 1008-1012 for LED 904 is not performed. Additionally, the amount of power reduction to LEDs 904, 906, and 908 in time division and adjustment algorithm 1000 is a matter of design choice. Interspacing time division 1100 depicts drive currents $i_{LED\_R}$, $i_{LED\_G}$, and $i_{LED\_B}$ reducing to zero during time division power modulation times. The reduction amount is a matter of design choice. In at least one embodiment, the drive currents $i_{LED\_R}$, $i_{LED\_G}$, and/or $i_{LED\_B}$ are reduced a specific percentage between approximately 10% and 90%. By reducing the drive currents $i_{LED\_R}$, $i_{LED\_G}$, and/or $i_{LED\_B}$ to a value less than a nominal value, controller 912 accounts for the brightness contribution of all LEDs 904, 906, and 908 to the brightness indicated by sense signal $SEN_1$ when determining the adjustment to be made in operation 1012.

In at least one embodiment, LEDs 904, 906, and/or 908 each represent a single LED. In at least one embodiment, one, two, or all of LEDs 904, 906, and 908 represent a set of LEDs that includes multiple LEDs having the same spectrum. For example, in at least one embodiment, LED 904 represents multiple red LEDs, LED 906 represents multiple green LEDs, and LED 908 represents multiple blue LEDs. The time division and adjustment algorithm 1000 applies regardless of the number of LEDs in LEDs 904, 906, and 908.

The time division and adjustment algorithm 1000 also includes optional operation 1018 to calibrate the target data. In at least one embodiment, light sensor 920 is sensitive to temperature changes, which affects accuracy of the value provided for sense signal $SEN_1$. For example, in at least one embodiment, as the temperature of light sensor 920 increases, the value of sense signal $SEN_1$ changes for the same brightness level of light 922 received by light sensor 920. However, in at least one embodiment, the relationship between temperature changes of light sensor 920 and sense signal $SEN_1$ is known. In at least one embodiment, light sensor 920 provides temperature information to controller 912, or controller 912 senses the temperature in or near light sensor 920. Using this relationship, controller 912 accordingly calibrates the target data to compensate for effects of temperature on the accuracy of the values for sense signal $SEN_1$. In at least one embodiment, the light sensor 920 is self-compensating for temperature changes, thus, eliminating a need for optional operation 1018. In at least one embodiment, temperature effects on the accuracy of values for sense signal $SEN_1$ are either negligible or not considered in time division and adjustment algorithm 1000. The target data can also be adjusted to compensate for operating characteristics associated with light sensor 920. For example, in at least one embodiment, the reception by broad spectrum light sensor 920 is not uniform across the spectrum. The target data can be adjusted to account for the non-uniformity. In at least one embodiment, the adjustment is made during a calibration test by a manufacturer or distributor of lamp 902.

The time division and adjustment algorithm 1000 represents one embodiment of a time division and adjustment algorithm that can be used to sense and, if appropriate, adjust the brightness of one or more LEDs in lighting system 900. The number of time division and adjustment algorithms that can be used by lighting system 900 is virtually limitless. For example, operations 1006 and 1008 can be executed for each of LEDs 904, 906, and 908, the sense signal $SEN_1$ stored for each of LEDs 904, 906, and 908, and operations 1010 and 1012 repeated for each of LEDs 904, 906, and 908. Additionally, the time intervals for reduction of power, such as between $t_2$ and $t_1$, $t_4$ and $t_3$, and so on of time division power modulation in interspacing time division 1100 is a matter of design choice, and the range of power reductions is a matter of design choice. In at least one embodiment, the time intervals for reduction of power are less than an amount of time for a human to perceive a reduction in power by perceiving a change in brightness of the lighting system 900.

Figure 12:
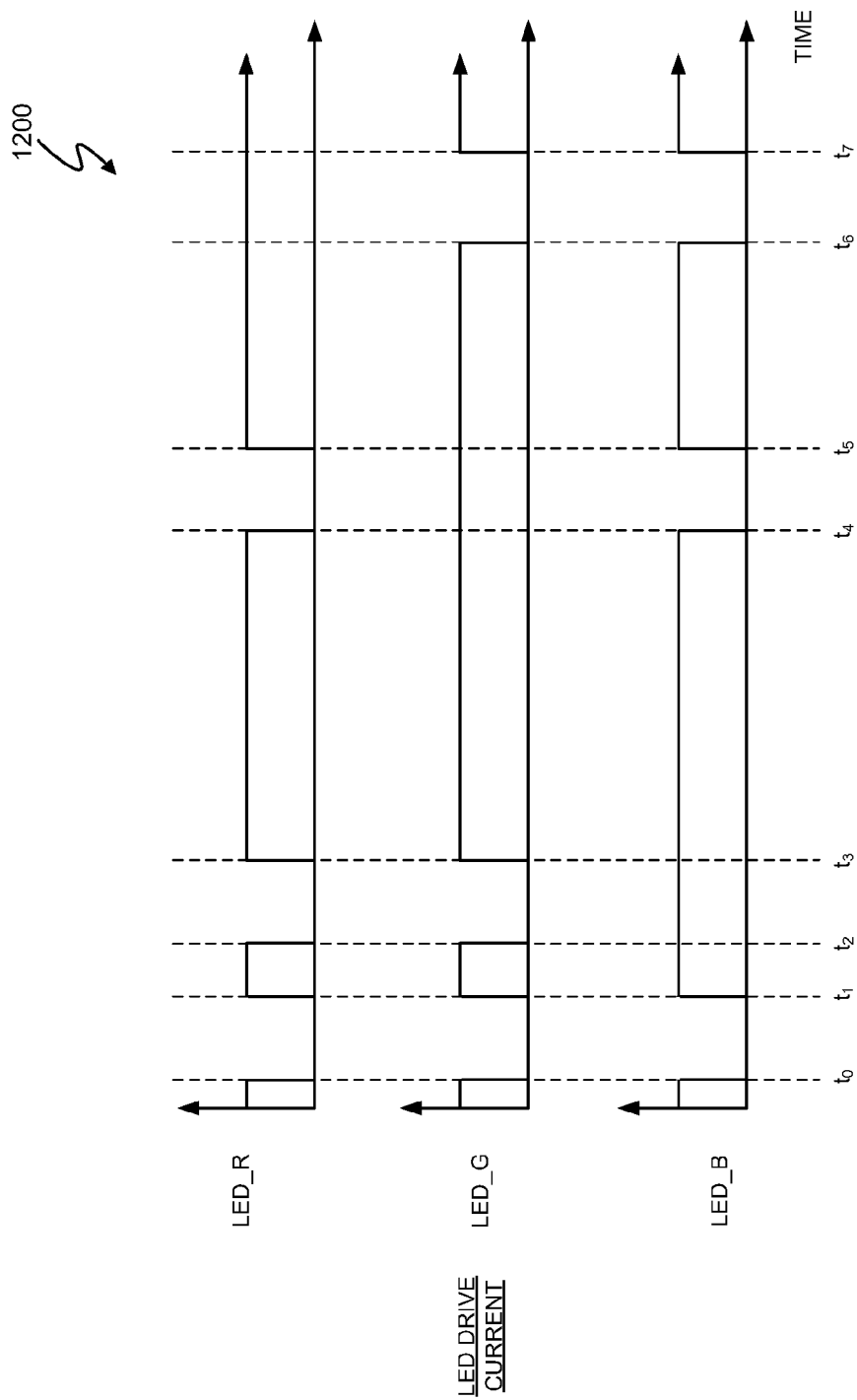
FIG. 12 depicts an LED drive current signal timing diagram which illustrates an interspersed time division for the algorithm of FIG. 10.

FIG. 12 depicts an LED current drive timing diagram 1200. Timing diagram 1200 illustrates interspersed time division, which represents another embodiment of a timing division power modulation scheme. Timing diagram 1200 is similar to interspacing time division 1100 except that the timing between reductions of power for different LEDs is clearly shown as interspersed over time. Time division and adjustment algorithm 1000 works identically with interspersed time division 1200 as time division and adjustment algorithm 1000 works with interspacing time division 1100. Using interspersed time division 1200 spreads out the times between reductions in drive currents $i_{LED\_R}$, $i_{LED\_G}$, and $i_{LED\_B}$, thereby reducing the perceptibility of altering the brightness of light 926 during execution of time division and adjustment algorithm 1000.

Figure 13:
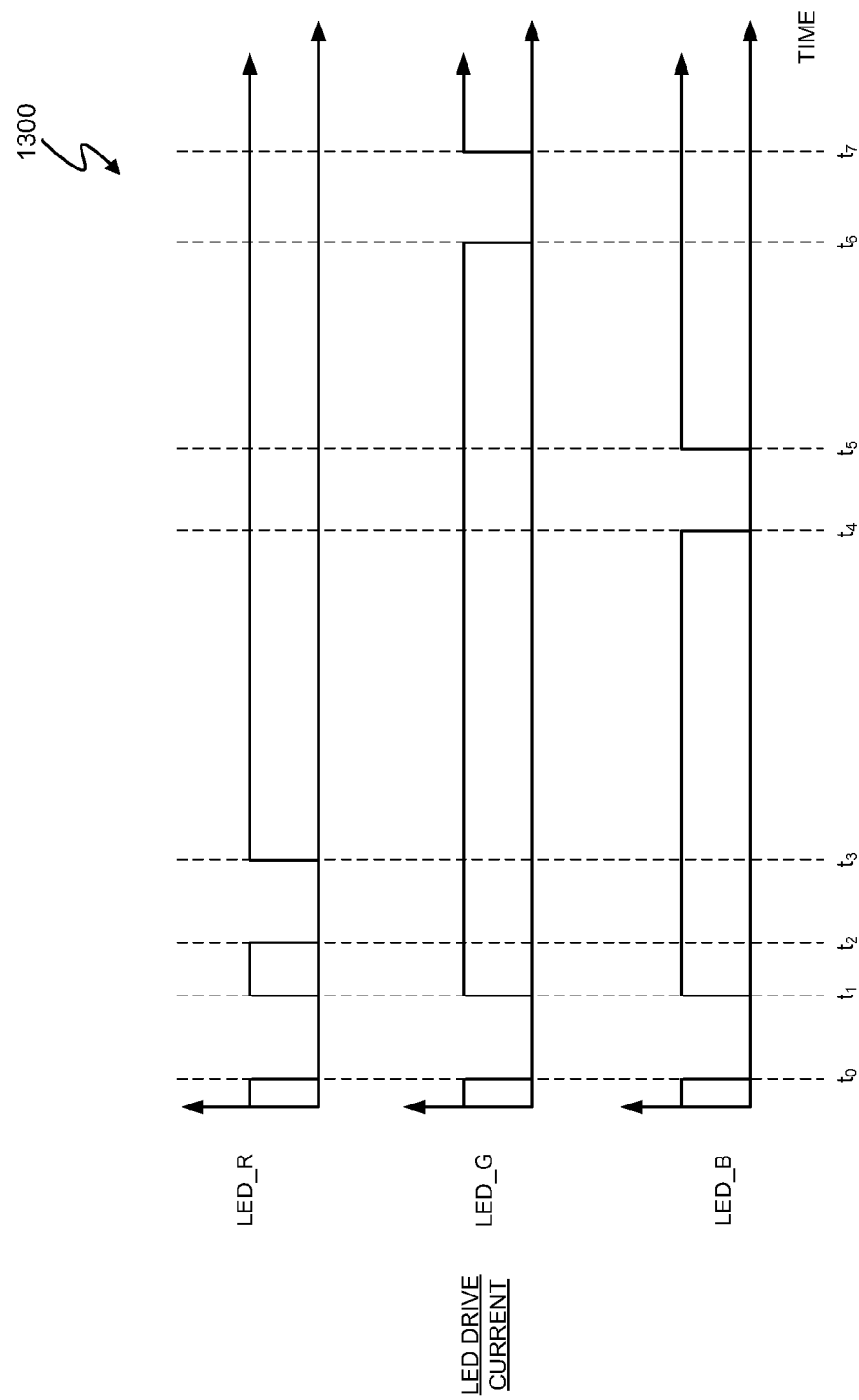
FIG. 13 depicts an LED drive current signal timing diagram which illustrates a unitary time division for the algorithm of FIG. 10.
Figure 14:
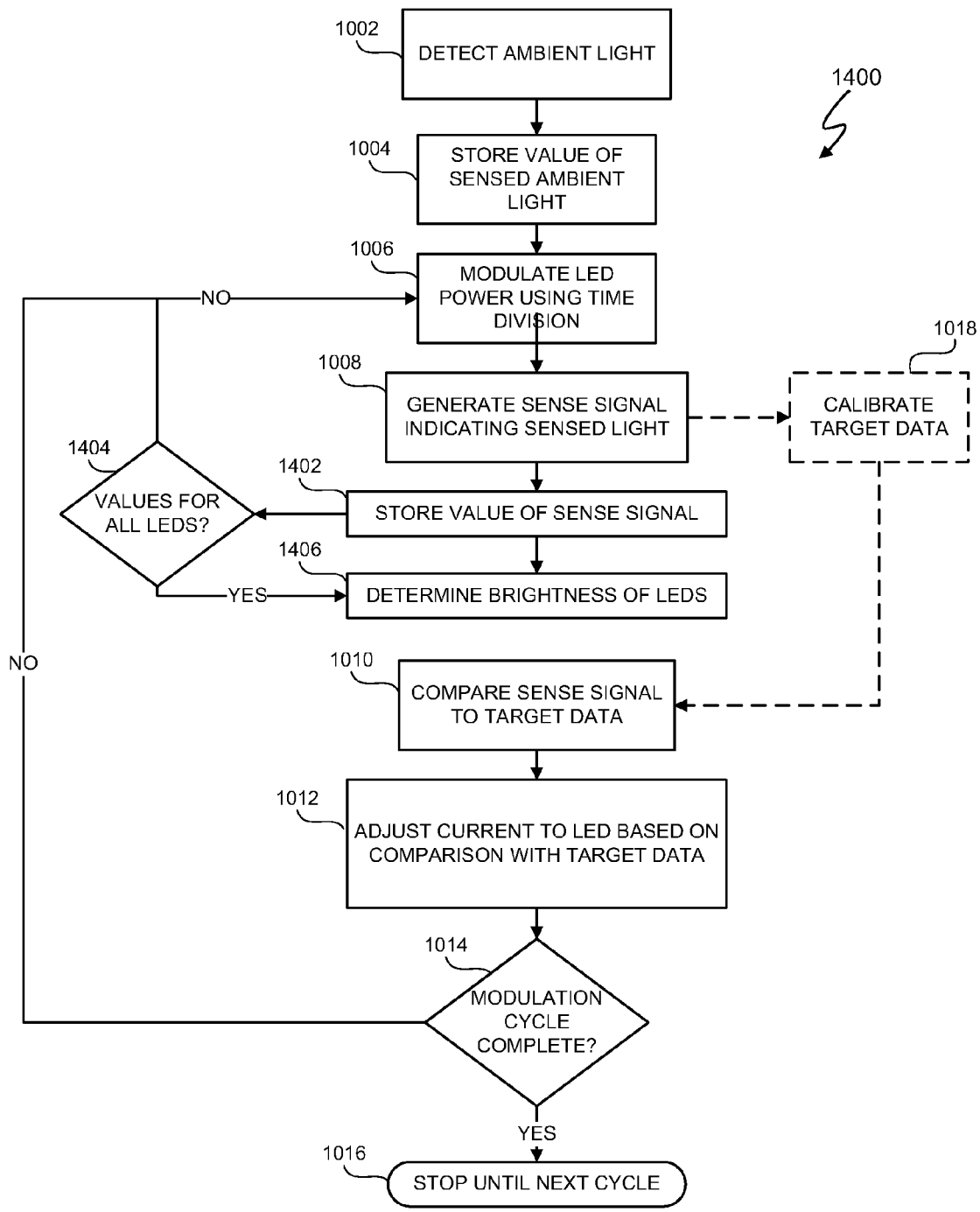
FIG. 14 depicts another embodiment of a time division and adjustment algorithm for the lighting system of FIG. 9.

FIG. 13 depicts an LED current drive timing diagram 1300. Timing diagram 1300 illustrates unitary time division, which represents yet another embodiment of a timing division power modulation scheme. Unitary time division in timing diagram 1300 reduces current to LEDs 904, 906, and 908 one at a time during respective periods $t_2$-$t_3$, $t_6$-$t_7$, and $t_4$-$t_5$. FIG. 14 depicts a time division and adjustment algorithm 1400 for implementing unitary time division. In at least one embodiment, in order to utilize unitary time division, time division and adjustment algorithm 1000 is modified to, for example, include operations 1402-1406. In operation 1006, time division module 924 modulates power to LEDs 904, 906, and 908 in accordance with LED current drive timing diagram 1300. Operation 1402 stores each value of sense signal $SEN_1$ for each reduction in power to LEDs 904, 906, and 908 in a memory (not shown) within, or accessible to, controller 912. Sense signal $SEN_1$ is generated in operation 1008 for a brightness levels sensed during time $t_2$-$t_3$. Operation 1404 causes operations 1006, 1008, and 1402 to repeat until a sense signal $SEN_1$ is generated in operation 1008 for brightness levels sensed during times $t_6$-$t_7$ and $t_4$-$t_5$.

Once a brightness level has been determined during each of power modulation periods $t_2$-$t_3$, $t_6$-$t_7$, and $t_4$-$t_5$, controller 912 determines in operation 1406 the brightness of each of LEDs 904, 906, and 908. Each stored value of sense signal $SEN_1$ represents the brightness of the ambient light and the contribution of two of the LEDs 904, 906, and 908 as set forth in Equation [1]:

$$SEN_1 = BAL + BLEDx + BLEDy \qquad [1],$$

where BAL=the brightness of the ambient light, and BLEDx and BLEDy equal the respective brightness contributions of the two LEDs of LEDs 904, 906, and 908 whose power is not reduced in operation 1006. Since the brightness of the ambient light, BAL, is known from operations 1002 and 1004, in at least one embodiment, controller 912 uses a multi-variable, linear equation solution process to solve for the three values of sense signal $SEN_1$ stored in operation 1402 using three instances of Equation [1]. The particular linear equation solution process is a matter of design choice. For example, at time $t_3$:

$$SEN_1 = BAL + BLED906 + BLED908 \qquad [2],$$

at time $t_6$:

$$SEN_1 = BAL + BLED904 + BLED906 \qquad [3],$$

at time $t_7$:

$$SEN_1 = BAL + BLED904 + BLED908 \qquad [4].$$

Since the value of BAL and $SEN_1$ is known, Equation [2] can be solved for BLED906 in terms of BLED908 and substituted into Equation [3]. After the substitution, Equation [3] can be solved in terms of BLED908 and substituted into Equation [4]. After substitution, Equation [4] can be solved for the value of BLED908. From the value of BLED908, BLED906 and BLED904 can then be solved from Equation [2] then Equation [3].

Figure 15:
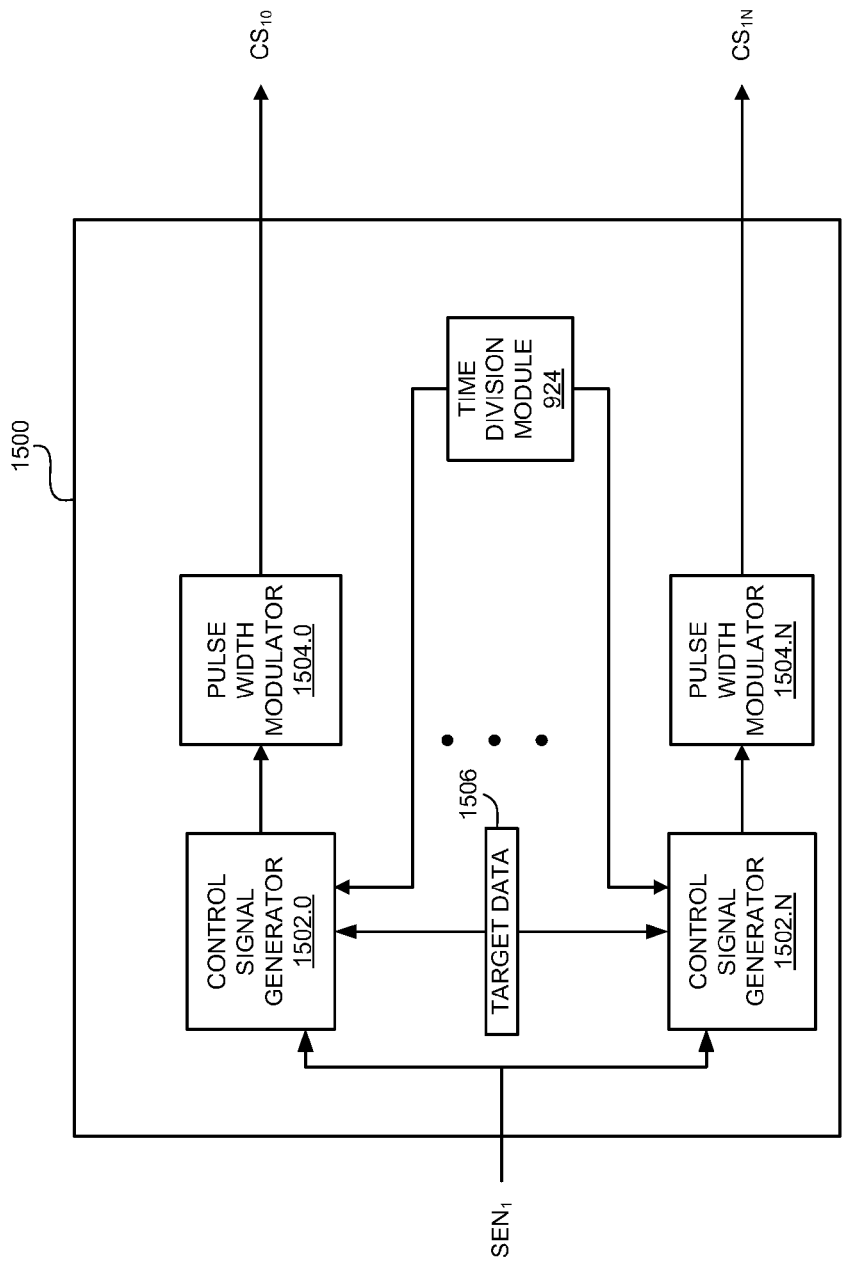
FIG. 15 depicts an embodiment of a controller of the lighting system of FIG. 8.

FIG. 15 depicts controller 1500, which represents one embodiment of controller 912. Controller 1500 includes control signal generators 1502.0-1502.N and pulse width modulators 1504.0-1504.N for generation of respective control signals $CS_{10}$ and $CS_{1N}$. In at least one embodiment, each of control signal generators 1502.0-1502.N and pulse width modulators 1504.0-1504.N operate in accordance with time division and adjustment algorithm 1000 or time division and adjustment algorithm 1400 to determine the brightness of light of at least two LEDs having different spectra and adjust the brightness in accordance with a comparison to values of target data 1506 representing a target brightness of the LEDs. Generally adjusting current to LEDs using pulse width modulated control signals control signals $CS_{10}$ and $CS_{1N}$ is illustratively described in Melanson II. In at least one embodiment, control signal generators 1502.0-1502.N cause control signals $CS_{10}$ and $CS_{1N}$ to have no pulse during sensing of ambient light in operation 1002 (FIGS. 10 and 14).

Thus, a lighting system includes time division light output sensing and adjustment for different spectra light emitting diodes (LEDs). In at least one embodiment, the time division light output sensing and adjustment allows the lighting system to individually adjust the brightness of LEDs to account for ambient light and changes in brightness of the LEDs.

Although the present invention has been described in detail, it should be understood that various changes, substitutions and alterations can be made hereto without departing from the spirit and scope of the invention as defined by the appended claims.

What is claimed is:
1. An apparatus comprising:
a controller configured to couple to a sensor and a first light emitting diode (LED) of a lamp, wherein the controller is further configured to:
 i. reduce power to a first light emitting diode (LED) coupled to the controller to a value greater than zero;
 ii. receive a signal from the sensor indicating a brightness of light received by the sensor while the power to the first LED is reduced; and iii. adjust the brightness of the first LED in accordance with a brightness related target value and the brightness indicated by the signal from the sensor.

2. The apparatus of claim 1 wherein the controller is configured to receive a sense signal from a light sensor indicating a brightness of ambient light and adjust the brightness of the LED to complement the ambient light.

3. The apparatus of claim 1 wherein reducing power to the first LED comprises reducing current to the first LED.

4. The apparatus of claim 1 wherein the controller is further configured to synchronize multiple controllers, wherein each of the multiple controllers is configured to:
   i. reduce power to an LED coupled to the controller during a same period of time as a reduction in power to LEDs coupled to each of the other controllers;
   ii. receive a signal from a sensor indicating a brightness of light received by the sensor while the power to the LED coupled to the controller is reduced; and
   iii. adjust the brightness of the LED coupled to the controller in accordance with a brightness related target value.

5. The apparatus of claim 1 wherein the controller is further configured to:
   i. receive a first signal indicating a brightness of received light at a first time;
   ii. receive a second signal indicating a brightness of the received light at a second time, wherein a relative contribution to the brightness from the first LED and a second LED is different for the first and second times and wherein the light emitted from the first LED has a different spectrum than the light emitted from the second LED;
   iii. determine the brightness of light emitted from the first LED and the brightness of light emitted from the second LED using information from the signals; and
   iv. adjust the brightness of the light emitted from the first LED and the brightness of the light emitted from the second LED in accordance with one or more brightness related target values.

6. The apparatus of claim 5 wherein the first and second LEDs are members of groups consisting of: red and green, red and yellow, amber and blue, green and blue, and red and blue.

7. The apparatus of claim 5 wherein the first LED is a member of a first set of multiple LEDs having approximately identical spectra and the second LED is a member of a second set of multiple LEDs having approximately identical spectra.

8. The apparatus of claim 5 wherein the controller is further configured to:
   adjust the brightness of the first and second LEDs to compensate for at one of (a) LED heating and (b) light output changes over time.

9. The apparatus of claim 5 wherein at least one of the sensors is a broad spectrum sensor.

10. The apparatus of claim 9 wherein a single, broad spectrum sensor provides the signals indicating brightness at the first and second times.

11. The apparatus of claim 5 wherein the controller is further configured to:
   modulate current to the first and second LEDs so that the relative contribution to the brightness of the light received by the one or more sensors is different for the first and second times.

12. The apparatus of claim 11 wherein to modulate current to the first and second LEDs comprises:
   reducing current to the first LED to zero while providing current to the second LED during the first time; and
   reducing current to the second LED to zero while providing current to the first LED during the second time.

13. The apparatus of claim 11 wherein to modulate current to the first and second LEDs comprises:
   providing less average current to the first LED than the second LED during the first time.

14. The apparatus of claim 11 wherein to modulate current to the first and second LEDs comprises:
   modulating current to the first and second LEDs during sequential times.

15. The apparatus of claim 11 wherein to modulate current to the first and second LEDs comprises:
   interspersing reductions in current to the first and second LEDs over time.

16. The apparatus of claim 1 wherein to reduce the power to a first LED comprises to reduce the power to the first LED from a first brightness level and the controller is further configured to:
   increase the power to the first brightness level with compensation for ambient light after receiving the signal from the sensor.

17. The apparatus of claim 1 wherein the controller comprises:
   a time division module configured to facilitate time division power modulation to (i) reduce the power to the LED for no more than 0.02 seconds to sense the brightness of light from the LED and ambient light and then (ii) increase the power to the LED.

18. The apparatus of claim 17 wherein the time division module is further configured to repeat the time division power modulation at least every 1 second for multiple cycles of the time division power modulation.

19. An apparatus comprising:
   a lamp having at least a first light emitting diode (LED);
   a sensor to sense brightness of received light; and
   a controller coupled to the lamp and the sensor, wherein the controller is configured to:
   i. reduce power to the first LED to a value greater than zero;
   ii. receive a signal from the sensor indicating the brightness of light received by the sensor while the power to the first LED is reduced; and
   iii. adjust the brightness of the first LED in accordance with a brightness related target value and the brightness indicated by the signal from the sensor.

20. The apparatus of claim 19 wherein the controller is configured to receive a sense signal from a light sensor indicating a brightness of ambient light and adjust the brightness of the LED to complement the ambient light.

21. The apparatus of claim 19 wherein reducing power to the first LED comprises reducing current to the first LED.

22. The apparatus of claim 19 wherein the controller is further configured to synchronize multiple controllers, wherein each of the multiple controllers is configured to:
   i. reduce power to an LED coupled to the controller during a same period of time as a reduction in power to LEDs coupled to each of the other controllers;
   ii. receive a signal from a sensor indicating a brightness of light received by the sensor while the power to the LED coupled to the controller is reduced; and
   iii. adjust the brightness of the LED coupled to the controller in accordance with a brightness related target value.

23. The apparatus of claim 19 wherein the controller is further configured to:
   i. receive a first signal indicating a brightness of received light at a first time;
   ii. receive a second signal indicating a brightness of the received light at a second time, wherein a relative contribution to the brightness from the first LED and a second LED is different for the first and second times and wherein the light emitted from the first LED has a different spectrum than the light emitted from the second LED;

iii. determine the brightness of light emitted from the first LED and the brightness of light emitted from the second LED using information from the signals; and iv. adjust the brightness of the light emitted from the first LED and the brightness of the light emitted from the second LED in accordance with one or more brightness related target values.

24. The apparatus of claim 19 wherein to reduce the power to a first LED comprises to reduce the power to the first LED from a first brightness level and the controller is further configured to:

increase the power to the first brightness level with compensation for ambient light after receiving the signal from the sensor.

25. The apparatus of claim 19 wherein the controller comprises:

a time division module configured to facilitate time division power modulation to (i) reduce the power to the LED for no more than 0.02 seconds to sense the brightness of light from the LED and ambient light and then (ii) increase the power to the LED.

26. The apparatus of claim 25 wherein the time division module is further configured to repeat the time division power modulation at least every 1 second for multiple cycles of the time division power modulation.

27. A method for light harvesting, the method comprising:

reducing power to a first light emitting diode (LED) to a value greater than zero;

receiving a signal indicating a brightness of light while the power to the first LED is reduced; and adjusting the brightness of the first LED in accordance with a brightness related target value and the brightness indicated by the signal.

28. The method of claim 27 wherein the method further comprises:

receiving a sense signal from a light sensor indicating a brightness of ambient light; and adjusting the brightness of the LED to complement the ambient light.

29. The method of claim 27 wherein reducing power to the first LED comprises reducing current to the first LED.

30. The method of claim 27 further comprising:

operating multiple controllers in synchronization, wherein operating multiple controllers in synchronization comprises:

reducing power to an LED coupled to the controller during a same period of time as a reduction in power to LEDs coupled to each of the other controllers;

receiving a signal from a sensor indicating a brightness of light received by the sensor while the power to the LED coupled to the controller is reduced; and adjusting the brightness of the LED coupled to the controller in accordance with a brightness related target value.

31. The method of claim 27 further comprising:

receiving a first signal indicating a brightness of received light at a first time;

receiving a second signal indicating a brightness of the received light at a second time, wherein a relative contribution to the brightness from the first LED and a second LED is different for the first and second times and wherein light emitted from the first LED has a different spectrum than the light emitted from the second LED;

determining the brightness of light emitted from the first LED and the brightness of light emitted from the second LED using information from the signals; and adjusting the brightness of the light emitted from the first LED and the brightness of the light emitted from the second LED in accordance with one or more brightness related target values.

32. The method of claim 31 wherein the first and second LEDs are members of groups consisting of: red and green, red and yellow, amber and blue, green and blue, and red and blue.

33. The method of claim 31 wherein the first LED is a member of a first set of multiple LEDs having approximately identical spectra and the second LED is a member of a second set of multiple LEDs having approximately identical spectra.

34. The method of claim 31 further comprising:

adjusting the brightness of the first and second LEDs to compensate for at one of (a) LED heating and (b) light output changes over time.

35. The method of claim 31 wherein at least one of the sensors is a broad spectrum sensor.

36. The method of claim 35 wherein a single, broad spectrum sensor provides the signals indicating brightness at the first and second times.

37. The method of claim 31 further comprising:

modulating current to the first and second LEDs so that the relative contribution to the brightness of the light received by the one or more sensors is different for the first and second times.

38. The method of claim 37 wherein modulating current to the first and second LEDs comprises:

reducing current to the first LED to zero while providing current to the second LED during the first time; and reducing current to the second LED to zero while providing current to the first LED during the second time.

39. The method of claim 37 wherein modulating current to the first and second LEDs comprises:

providing less average current to the first LED than the second LED during the first time.

40. The method of claim 37 wherein modulating current to the first and second LEDs comprises:

modulating current to the first and second LEDs during sequential times.

41. The method of claim 37 wherein to modulate current to the first and second LEDs comprises:

interspersing reductions in current to the first and second LEDs over time.

42. The method of claim 27 wherein reducing power to a first LED comprises reducing the power to the first LED from a first brightness level, and the method further comprises:

increasing the power to the first brightness level with compensation for ambient light after receiving the signal indicating the brightness of light while the power to the first LED is reduced.

43. The method of claim 27 wherein the method further comprises:

reducing power for no more than 0.02 seconds and then increasing power to the first LED using time division power modulation to respectively (i) reduce the power to the LED to sense the brightness of light from the LED and ambient light and (ii) increase the power to the LED.

44. The method of claim 43 further comprising:

repeating the time division power modulation at least every 1 second for multiple cycles of the time division power modulation.

45. An apparatus for light harvesting comprising:
means for reduce power to a first light emitting diode (LED) to a value greater than zero;
means for receiving a signal indicating a brightness of light while the power to the first LED is reduced; and
means for adjusting the brightness of the first LED in accordance with a brightness related target value and the brightness indicated by the signal from the sensor.

* * * * *

UNITED STATES PATENT AND TRADEMARK OFFICE
CERTIFICATE OF CORRECTION

| | |
|---|---|
| PATENT NO. | : 8,362,707 B2 |
| APPLICATION NO. | : 12/495206 |
| DATED | : January 29, 2013 |
| INVENTOR(S) | : William A. Draper and John L. Melanson |

It is certified that error appears in the above-identified patent and that said Letters Patent is hereby corrected as shown below:

Claim 8, col. 15, line 49, "at one" should be --at least one--;

Claim 45, col. 19, line 2, "reduce" should be --reducing--.

Signed and Sealed this
Twelfth Day of March, 2013

Teresa Stanek Rea
*Acting Director of the United States Patent and Trademark Office*